United States Patent
Zahdeh et al.

(10) Patent No.: US 12,391,475 B2
(45) Date of Patent: Aug. 19, 2025

(54) AUTONOMOUS TRANSPORT VEHICLE

(71) Applicant: Symbotic LLC, Wilmington, MA (US)

(72) Inventors: Akram Zahdeh, Wilmington, MA (US); Todd Kepple, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 314 days.

(21) Appl. No.: 17/664,843

(22) Filed: May 24, 2022

(65) Prior Publication Data

US 2023/0075455 A1 Mar. 9, 2023

Related U.S. Application Data

(60) Provisional application No. 63/241,893, filed on Sep. 8, 2021.

(51) Int. Cl.
*B65G 1/04* (2006.01)
*B65G 1/137* (2006.01)
*G05D 1/00* (2006.01)

(52) U.S. Cl.
CPC ......... *B65G 1/0492* (2013.01); *B65G 1/1373* (2013.01); *G05D 1/0088* (2013.01)

(58) Field of Classification Search
CPC .................................................. B65G 1/0492
See application file for complete search history.

(56) References Cited

U.S. PATENT DOCUMENTS

| | | | |
|---|---|---|---|
| 9,878,587 B1 | 1/2018 | Zevenbergen | |
| 10,106,383 B2 * | 10/2018 | Shen | B66F 7/0625 |
| 10,902,880 B2 * | 1/2021 | Pajevic | G11B 19/265 |
| 11,059,707 B2 * | 7/2021 | Chow | B66F 9/0755 |
| 11,338,998 B1 * | 5/2022 | Keck | B65G 41/008 |
| 11,790,295 B1 * | 10/2023 | Theobald | B65G 1/10 700/218 |
| 2019/0092570 A1 * | 3/2019 | Macdonald | G06N 7/00 |
| 2021/0130091 A1 * | 5/2021 | Austrheim | B65G 1/0464 |

* cited by examiner

*Primary Examiner* — Jonathan Snelting
(74) *Attorney, Agent, or Firm* — Perman & Green, LLP

(57) ABSTRACT

An autonomous transport robot vehicle for transporting a payload, includes a chassis that is a space frame formed of longitudinal hollow section beams, arrayed to form longitudinally extended sides of the space frame, and respective front and rear lateral beams closing opposite ends of the space frame. A payload support is connected to the chassis. Ride wheels depend from the chassis. The ride wheels and chassis in combination form a low profile height from the traverse surface to atop the chassis, where chassis height and ride wheel height are overlapped at least in part and the payload support is nested within the ride wheels. The space frame has predetermined modular coupling interfaces, each disposed for removably coupling, as a module unit, a corresponding predetermined electronic or mechanical component module of the autonomous transport robot vehicle to the chassis.

22 Claims, 11 Drawing Sheets

AUTONOMOUS TRANSPORT VEHICLE

CROSS-REFERENCE TO RELATED APPLICATIONS

This application is a non-provisional of and claims the benefit of U.S. provisional patent application No. 63/241,893 filed on Sep. 8, 2021, the disclosure of which is incorporated herein by reference in its entirety.

BACKGROUND

1. Field

The disclosed embodiment generally relates to material handling systems, and more particularly, to transports for automated storage and retrieval systems.

2. Brief Description of Related Developments

Generally, autonomous transport vehicles in logistics/warehouse facilities are manufactured to have a predetermined form factor for an assigned task in a given environment. These autonomous transport vehicles are constructed of a bespoke cast or machined chassis/frame that is generally heavy and costly to produce. The other components (e.g., wheels, transfer arms, etc.) are mounted to the frame and are carried with the frame as the autonomous transport vehicle traverses along a traverse surface. The mass of the autonomous transport vehicle, in part from the cast or machined frame, calls for appropriately sized motors and suspension components to drive and carry the mass of the autonomous transport vehicles. These motors and suspension components may also increase the cost and weight of the autonomous transport vehicle.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
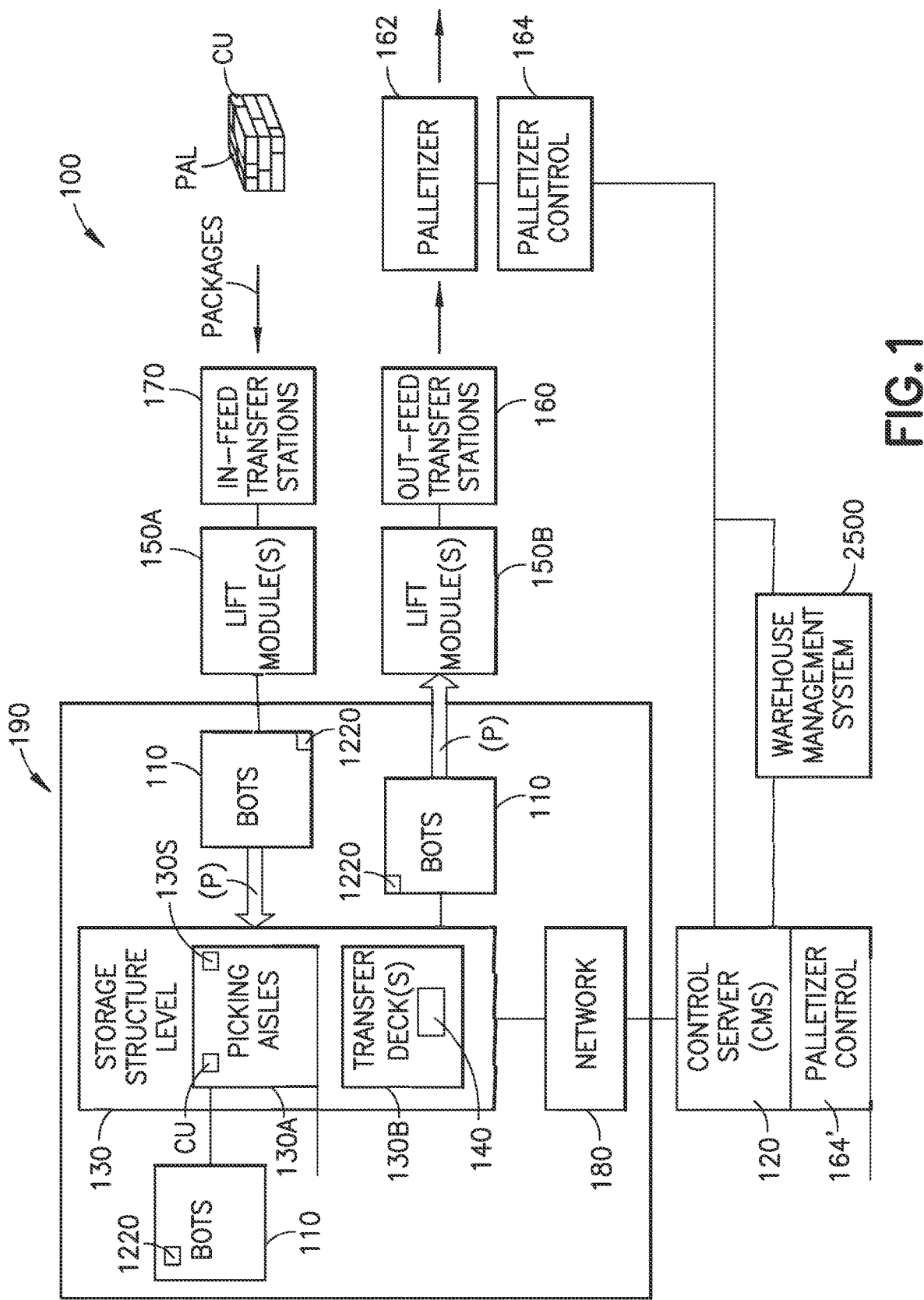
FIG. 1 is an exemplary schematic block diagram of an automated storage and retrieval system incorporating aspects of the disclosed embodiment.

FIG. 1 illustrates an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment provide an automated storage and retrieval system with a modular autonomous transport robot vehicle 110 (referred to herein as an autonomous transport (or guided) vehicle or bot). The autonomous transport vehicle 110 includes selectable modular chassis, motor, and case unit handling components, the selection of which configures (or reconfigures) the autonomous transport vehicle 110 with different case handling characteristics (e.g., chassis length, chassis width, payload area size, case unit lift height, suspension spring preload, suspension spring rate, chassis rigidity characteristics, etc.) that may depend on a size/weight of the case units being handled and/or storage characteristics (e.g., shelf height, multiple shelves serviced from a common rolling surface/deck) of the automated storage and retrieval system 100 storage structure 130. The modular chassis components (described herein) may be fabricated at least in part from readily available bar stock, tubing stock, channel stock, etc. so as to reduce manufacturing/machining costs compared to conventional autonomous transport vehicles having bespoke chassis/frames. At least the modular chassis components contribute to a reduced weight compared to the conventional autonomous transport vehicles having bespoke chassis/frames. The reduced weight may provide for less wear on the rolling surfaces along which the autonomous transport vehicle 110 travels as well as less wear on the wheels of the autonomous transport vehicle 110.

The automated storage and retrieval system 100 in FIG. 1, in which the autonomous transport vehicle 110 operates, may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained), and/or a tote of individual goods that are of a common or mixed goods type. It is noted that the case units CU (also referred to herein as mixed cases, cases, shipping units, or payload) may include cases of items/unit (e.g. case of soup cans, boxes of cereal, etc.) or individual item/units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. Case units may also include totes, boxes, and/or containers of one or more individual goods, unpacked/decommissioned (generally referred to as breakpack goods) from original packaging and placed into the tote, boxes, and/or containers (collectively referred to as totes) with one or more other individual goods of mixed or common types at an order fill station. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases or totes filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system may be generally described as a storage and retrieval engine 190 coupled to a palletizer 162. In greater detail now, and with reference still to FIG. 1, the storage and retrieval system 100 may be configured for installation in, for example, existing warehouse structures or adapted to new warehouse structures. As noted before the system 100 shown in FIG. 1 is representative and may include for example, in-feed and out-feed conveyors terminating on respective transfer stations 170, 160, lift module(s) 150A, 150B, a storage structure 130, and a number of autonomous transport vehicles 110 (also referred to herein as "bots"). It is noted that the storage and retrieval engine 190 is formed at least by the storage structure 130 and the bots 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system may also include robot or bot transfer stations (not shown) that may provide an interface between the bots 110 and the lift module(s) 150A, 150B. The storage structure 130 may include multiple levels of storage rack modules where each level includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the bots 110 (such as along rails) while in other aspects the picking aisles are configured to provide unrestrained travel of the bot 110 (e.g., the picking aisles are open and undeterministic with respect to bot 110 guidance/travel). The transfer decks 130B have open and undeterministic bot support travel surfaces along which the bots 110 travel under guidance and control provided by bot steering (as will be described herein). As used herein, "open and undeterministic" denotes the travel surface of the picking aisle and/or the transfer deck has no mechanical/physical restraints/guides (such as guide rails) that delimit the travel of the autonomous transport vehicle 110 to any given path along the travel surface. In one or more aspects, the transfer decks have multiple lanes between which the bots 110 freely transition for accessing the picking aisles 130A and/or lift modules 150A, 150B. The picking aisles 130A, and transfer decks 130B also allow the bots 110 to place case units CU into picking stock and to retrieve ordered case units CU. In alternate aspects, each level may also include respective bot transfer stations 140. It is noted that while the aspects of the disclosed embodiment are described with respect to a multilevel storage array, the aspects of the disclosed embodiment may be equally applied to a single level storage array that is disposed on a facility floor or elevated above the facility floor.

The bots 110 may be configured to place case units, such as the above described retail merchandise, into picking stock in the one or more levels of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more levels of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100.

As may be realized, the storage and retrieval system 100 may include multiple in-feed and out-feed lift modules 150A, 150B that are accessible by, for example, bots 110 of the storage and retrieval system 100 so that one or more case unit(s), uncontained (e.g. case unit(s) are not held in trays), or contained (within a tray or tote) can be transferred from a lift module 150A, 150B to each storage space on a respective level and from each storage space to any one of the lift modules 150A, 150B on a respective level. The bots 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example reciprocating lift, or any other suitable configuration. The lift module(s) 150A, 150B include any suitable controller (such as controller 120 or other suitable controller coupled to controller 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system may include a control system, comprising for example one or more control servers 120 that are communicably connected to the in-feed and out-feed conveyors and transfer stations 170, 160, the lift modules 150A, 150B, and the bots 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) 120 managing the case flow system. The network 180 may further include suitable communication for effecting a bi-directional interface with the bots 110. For example, the bots 110 may include an on-board processor/controller 1220. The network 180 may include a suitable bi-directional communication suite enabling the bot controller 1220 to request or receive commands from the control server 180 for effecting desired transport (e.g. placing into storage locations or retrieving from storage locations) of case units and to send desired bot 110 information and data including bot 110 ephemeris, status and other desired data, to the control server 120. As seen in FIG. 1, the control server 120 may be further connected to a warehouse management system 2500 for providing, for example, inventory management, and customer order fulfillment information to the CMS 120 level program. A suitable example of an automated storage and retrieval system arranged for holding and storing case units is described in U.S. Pat. No. 9,096,375, issued on Aug. 4, 2015 the disclosure of which is incorporated by reference herein in its entirety.

Figure 2A:
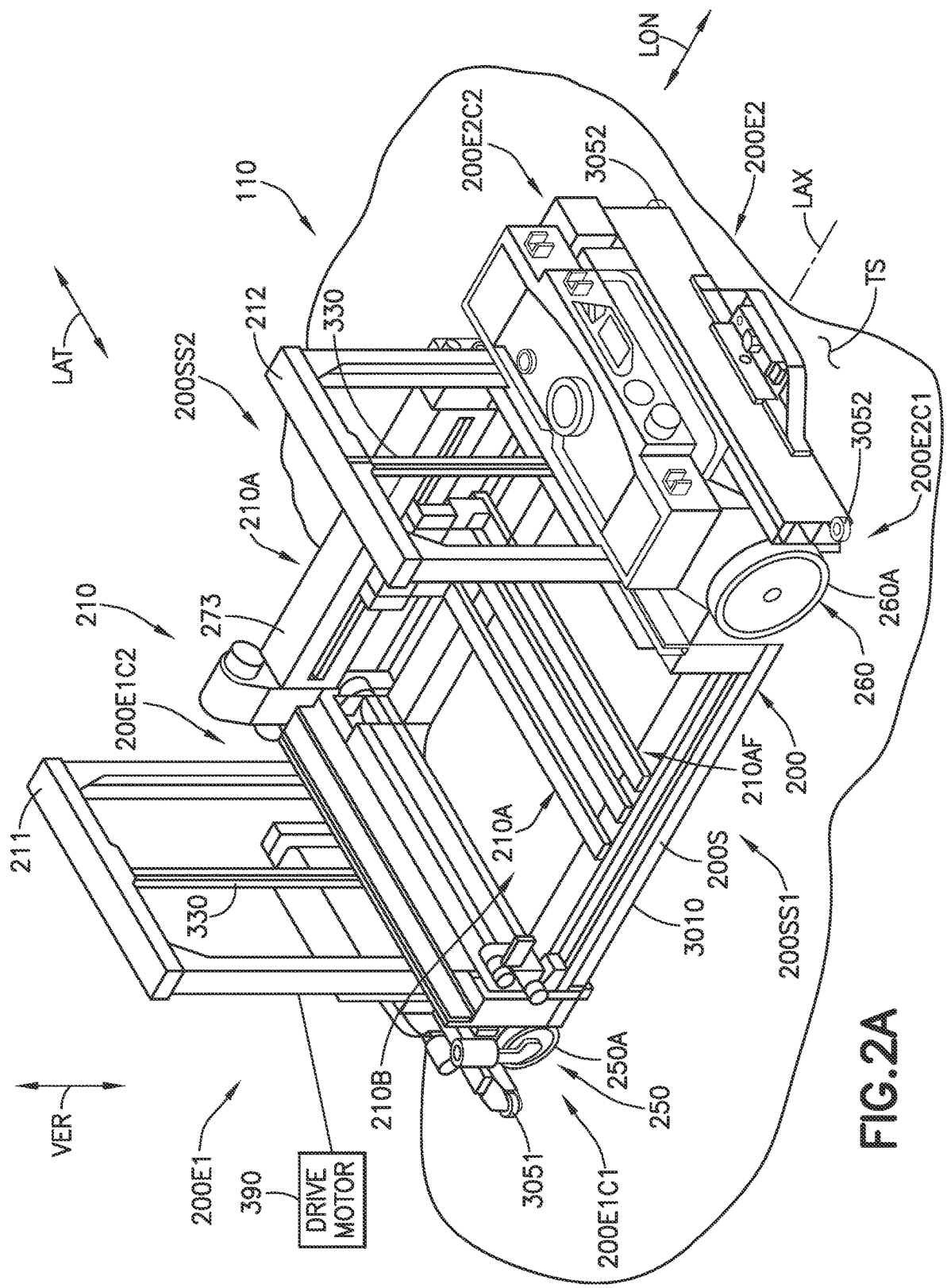
FIG. 2A is a schematic perspective illustration of an exemplary autonomous transport vehicle of the automated storage and retrieval system of FIG. 1 in a first configuration in accordance with aspects of the disclosed embodiment.
Figure 2B:
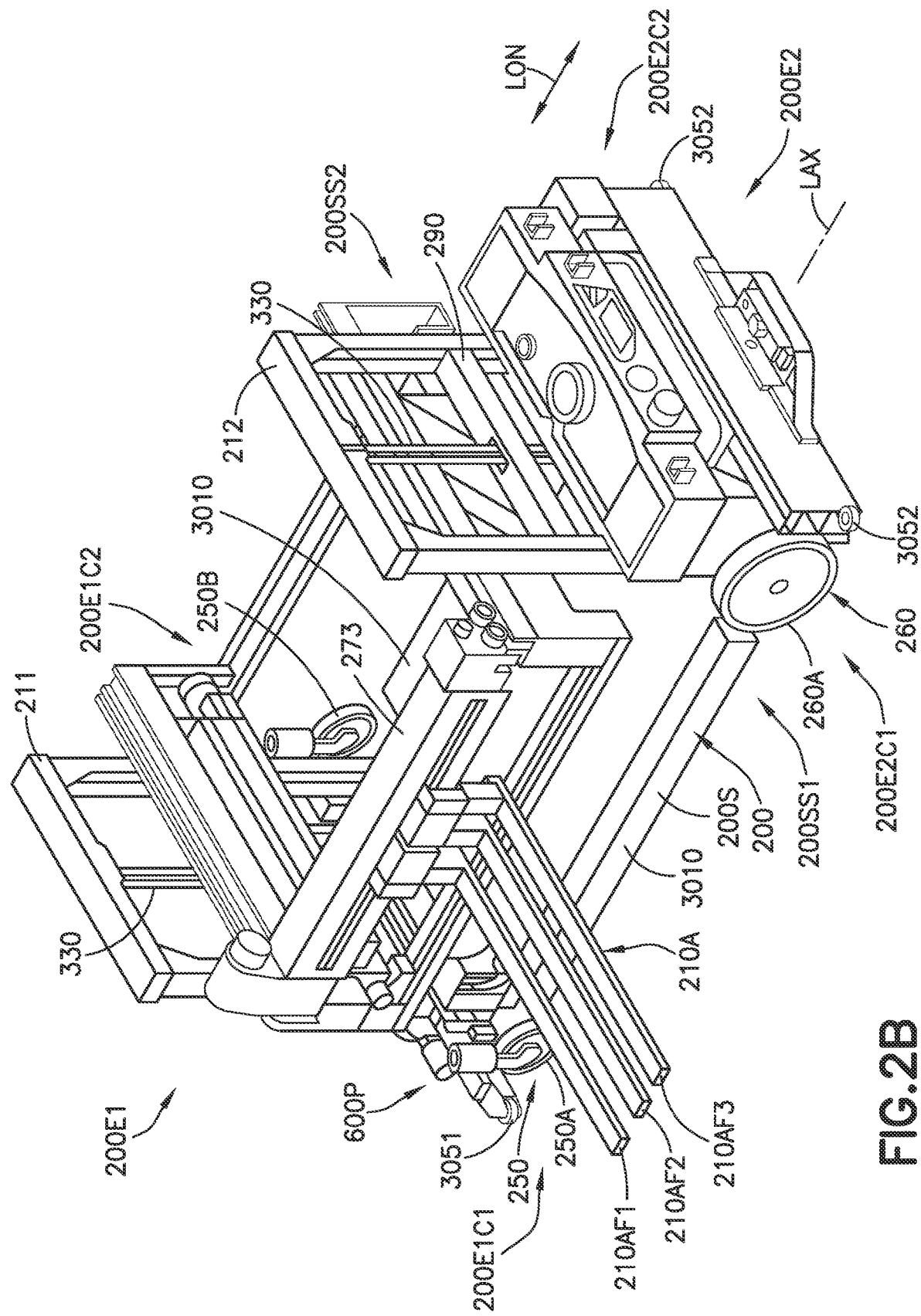
FIG. 2B is a schematic perspective illustration of the exemplary autonomous transport vehicle of FIG. 2A in a second configuration in accordance with aspects of the disclosed embodiment.
Figure 2C:
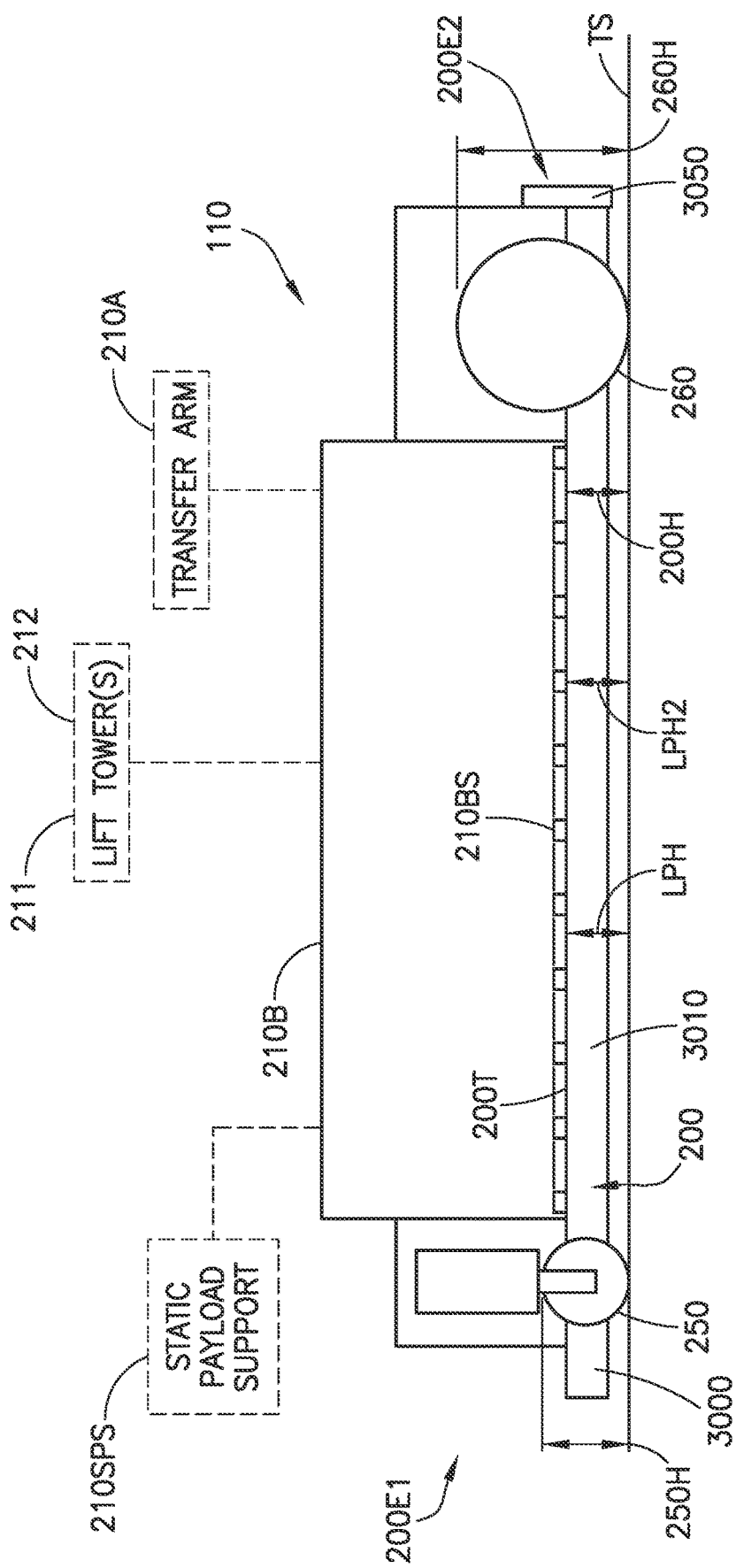
FIG. 2C is a schematic elevation illustration of the exemplary autonomous transport vehicle of FIG. 2A in accordance with aspects of the disclosed embodiment.

Referring now to FIGS. 2A, 2B, and 2C, the autonomous transport vehicle or bot 110 includes a chassis or chassis bus 200 having a front end 200E1 and a back end 200E2 that define a longitudinal axis LAX of the autonomous transport vehicle 110. The chassis 200 is a space frame 200S and may be constructed (e.g., formed) of any suitable material including but not limited to steel, aluminum, and composites. As will be described herein, the space frame 200S has predetermined modular coupling interfaces (see, e.g., interfaces 3070-3075—FIG. 3A) that have known locations relative to each other and include datums for positioning/locating components of the autonomous transport vehicle relative to each other as described herein. Each of the modular coupling interfaces is disposed for removably coupling, as a modular unit, a corresponding predetermined electronic and/or mechanical component module of the autonomous transport vehicle 110 to the chassis 200 so that the autonomous transport robot vehicle 110 has a modular construction. The predetermined modular coupling interfaces include at least one of at least one caster wheel module coupling interface 3074, 3075, at least one drive wheel module coupling interface 3072, 3073, and at least one payload support module coupling interface 3070, 3071. As described herein, the corresponding predetermined electronic and/or mechanical component modules include, but are not limited to, ride wheel modules (e.g., at least one drive wheel module 260M and at least one caster wheel module 250M), payload support module 210M, control module 1220M, etc. The drive wheel module 260M has a drive wheel 260A, 260B removably coupled as a module unit to the chassis 200 with a corresponding drive wheel module coupling interface 3072, 3073. The caster wheel module 250M has a caster wheel 250A, 250B removably coupled as a module unit to the chassis 200 with a corresponding caster wheel module coupling interface 3074, 3075. The payload support module 210M has a payload support contact surface 210BS removably coupled as a module unit to the chassis 200 with a corresponding payload support module coupling interface 3070, 3071.

The autonomous transport vehicle 110 also includes a case handling assembly or payload support 210 configured to handle cases/payloads transported by the autonomous transport vehicle 110. The payload support 210 may be provided as the payload support module 210M and is removably connected to the chassis 200 (e.g., with mechanical fasteners) and is dependent therefrom. The payload support 210 includes at least any suitable payload support contact surface 210B on which payloads are placed for transport. In one or more aspects, the payload support also includes any suitable transfer arm 210A configured to transfer payloads between the autonomous transport vehicle 110 and a payload holding location (such as any suitable payload storage location, a shelf of lift module 150A, 150B, and/or any other suitable payload holding location). The transfer arm 210A may be configured to extend laterally in direction LAT and/or vertically in direction VER to transport payloads to and from a payload area of the payload support 210. Examples of suitable payload support contact surfaces 210B and transfer arms 210A and/or autonomous transport vehicles to which the aspects of the disclosed embodiment may be applied can be found in United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

As will be described in greater detail herein, the chassis 200 includes ride wheels dependent from the chassis 200, proximate opposite end corners 200E1C1, 200E1C2, 200E2C1, 200E2C2 of the chassis 200, on which the autonomous transport vehicle 110 rides so as to traverse a traverse surface TS of the storage and retrieval system 100 storage structure level 130 on which the autonomous transport vehicle 110 is disposed. The ride wheels 250, 260 include at least one idler or caster wheel 250A, 250B and at least one drive wheel 260A, 260B supporting the chassis 200 from the traverse surface TS. For example, one or more idler wheels 250A, 250B are disposed adjacent the front end 200E1 (e.g., a pair of caster wheels 250A, 250B are illustrated in the figures for exemplary purposes) and one or more drive wheels 260A, 260B (e.g., a pair of drive wheels 260A, 260B are illustrated in the figures for exemplary purposes) are disposed adjacent the back end 200E2. In other aspects, the position of the idler wheels 250 and drive wheels 260 may be reversed (e.g., the drive wheels 260 are disposed at the front end 200E1 and the idler wheels 250 are disposed at the back end 200E2). It is noted that in some aspects, the autonomous transport vehicle 110 is configured to travel with the front end 200E1 leading the direction of travel or with the back end 200E2 leading the direction of travel. In one aspect, idler wheels 250A, 250B (which are substantially similar to idler wheel 250 described herein) are located at respective front corners of the chassis 200 at the front end 200E1 and drive wheels 260A, 260B (which are substantially similar to drive wheel 260 described herein) are located at respective back corners of the chassis 200 at the back end 200E2 (e.g., a support wheel is located at each of the four corners 200E1C1, 200E1C2, 200E2C1, 200E2C2 of the chassis 200) so that the autonomous transport vehicle 110 stably traverses the transfer deck(s) 130B and picking aisles 130A of the storage structure 130.

As will be described herein, the ride wheels 250, 260 and chassis 200 in combination form a low profile height LPH (FIG. 2C) that is a minimum height from the traverse surface TS to atop 200T the chassis 200, where chassis height 200H and ride wheel height (e.g., one or more of ride wheels heights 250H, 260H) are overlapped (coextensive) at least in part and a payload support contact surface 210BS of the payload support 210B (on which contact surface 210BS a payload, e.g., such as case unit CU, resting on the payload support 210B is seated) is nested within (e.g., between and within the height of at least one of) the ride wheels 250, 260 (see FIG. 2C). Here, the payload support contact surface 210BS disposed atop the chassis 200. The payload support contact surface 210BS may be disposed at a height LPH2 from the traverse surface TS that is substantially the same as the low profile height LPH, while in other aspects the height LPH2 may be greater than the low profile height LPH while still being nested within the ride wheels 250, 260 (see FIG. 2C).

Referring to FIGS. 2A, 2B, 2C, 3A, and 3B, the chassis 200, as noted herein, is a space frame 200S having a modular configuration/construction such that selection of chassis components from a number of different selectable chassis components configures and/or reconfigures the autonomous transport vehicle 110 for one or more of case transfer operations, employment in different storage and retrieval systems having different physical requirements for the autonomous transport vehicles 100, and/or different operational requirements of the autonomous transport vehicles 100 (e.g., suspension travel, case lift heights, ground clearance, automated charging configurations, etc.). The modular configuration of the chassis 200 also facilitates modular repair and/or maintenance of the autonomous transport vehicle 110 so as to reduce downtime (i.e., increase in-service time) of the autonomous transport vehicle 110. The space frame 200S is configured so that the chassis 200 is substantially rigid with predetermined rigidity characteristics, with a shape and form that provide the minimum low profile height LPH from the traverse surface TS to atop 200T the chassis 200. Examples of predetermined rigidity characteristics include, but are not limited to, generating a predetermined transient response of the chassis/payload support contact surface 210BS from one or more of bot traverse transient loads (as described in U.S. provisional patent application No. 63/213,589 filed on Jun. 22, 2021) and titled "Autonomous Transport Vehicle with Synergistic Vehicle Dynamic Response," the disclosure of which is incorporated herein by reference in its entirety), static and dynamic loads generated by actuation of the transfer arm/ end effector 210A, and loading/unloading payloads to/from the payload bed 21B and payload transfers. The space frame 200S configuration resolves both predetermined rigidity characteristics (as to imparted loads) and the minimum low profile height LPH of the chassis 200 from the traverse surface TS to atop 200T the chassis 200. As described herein, the chassis 200 has a selectably variable configuration, selectable from different configurations each having different chassis form factors (e.g., selectably variable lengths and/or widths). The predetermined rigidity characteristics include torsional rigidity of the space frame 200S along the longitudinal axis (e.g., twisting of the chassis about the longitudinal axis), bending rigidity of the space frame 200S along the lateral direction (e.g., from side to side), and bending rigidity of the space frame 200S along the longitudinal direction (e.g., from front to back). The predetermined rigidity characteristics result in deflection, with respect to the payload carried by vehicle 110, that is negligible/indiscernible for a given payload weight (e.g., such as payloads of up to about 60 lbs or more). The deflection is negligible/indiscernible with respect to the seating of the payload across a contact surface between the payload bed (or transfer arm) of the vehicle 110 and the payload such that the payload remains in substantially contact with the contact surface throughout travel of and/or a range of motion of the vehicle 110.

Figure 3A:
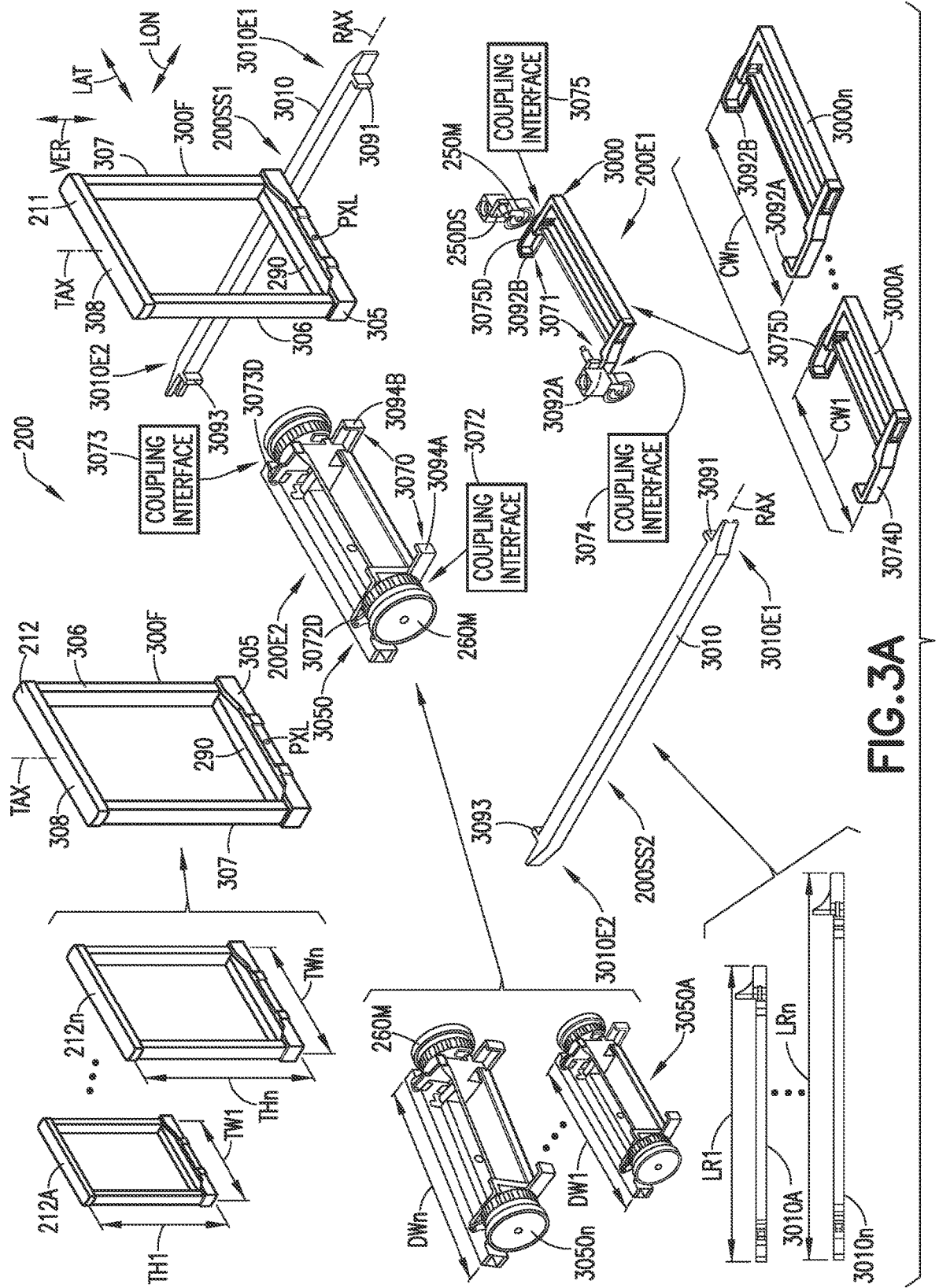
FIG. 3A is a schematic exploded illustration of a portion of the exemplary autonomous transport vehicle of FIG. 2A in accordance with aspects of the disclosed embodiment.
Figure 3B:
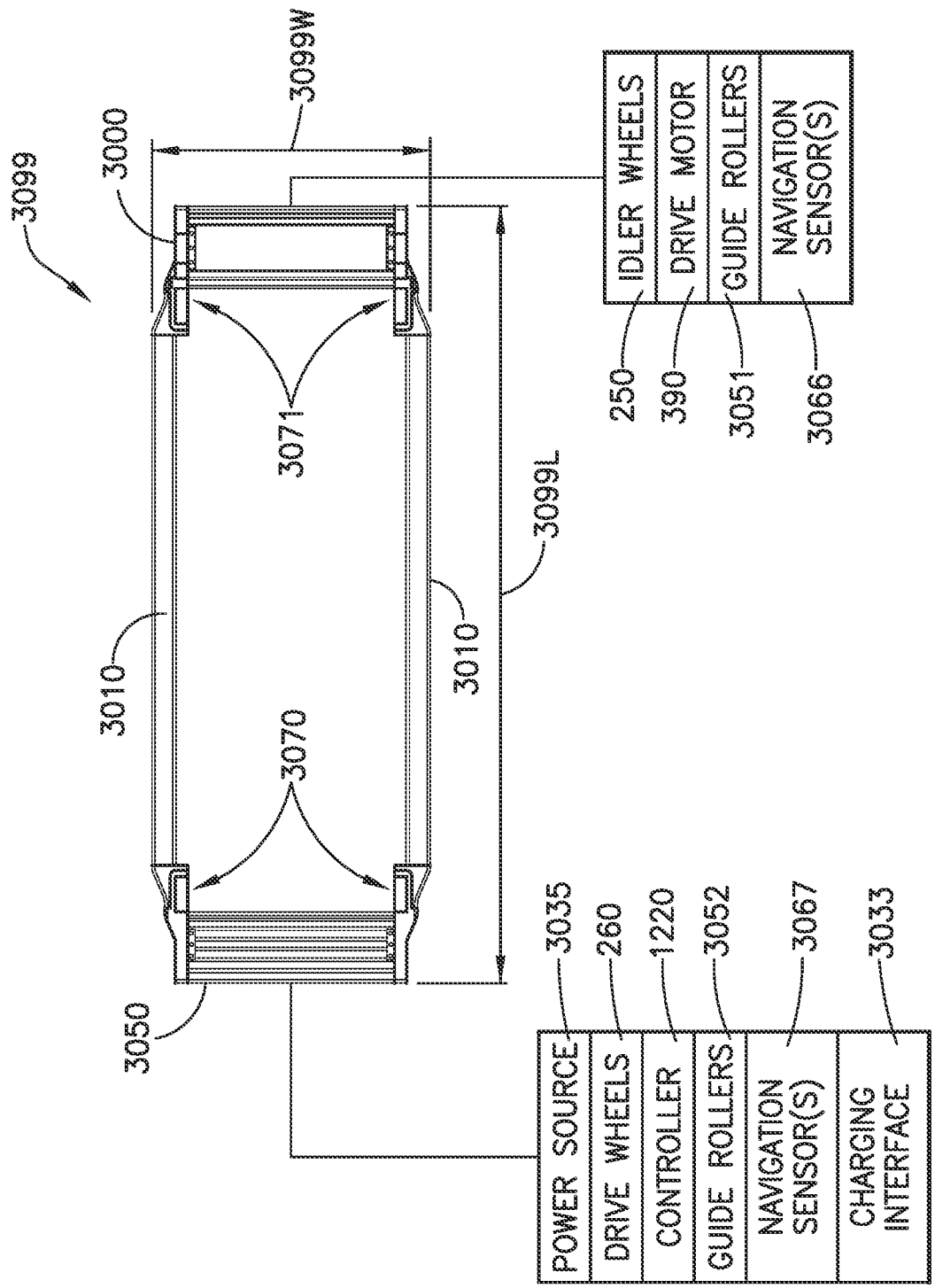
FIG. 3B is a schematic plan view of a portion of the exemplary autonomous transport vehicle of FIG. 2A in accordance with aspects of the disclosed embodiment.

Referring also to FIGS. 3A and 3B, the chassis 200 includes longitudinal hollow section beams 3010 that are arrayed to form longitudinally extended sides (or lateral sides) 200SS1, 200SS2 of the space frame 200S. The chassis 200 also includes a respective front lateral beam or cross-member 3000 and a respective rear lateral beam or cross-member 3050 closing opposite ends 200E1, 200E2 of the space frame 200S. As described herein, at least one of the longitudinal hollow section beams 3010, the front lateral beam 3000, and the rear lateral beam 3050, is/are selectable from a number of different selectably interchangeable respective longitudinal hollow section beams 3010A-3010$n$, front lateral beams 3000A-3000$n$, and rear lateral beams 3050A-3050$n$, each with different predetermined mechanical characteristics. Examples of the difference predetermined mechanical characteristics include, but are not limited to, material, cross-section, etc. Here, selection of the at least one of the longitudinal hollow section beams 3010, the front lateral beam 3000, and the rear lateral beam 3050 from the number of different selectably interchangeable respective longitudinal hollow section beams 3010A-3010$n$, the front lateral beams 3000A-3000$n$, and the rear lateral beams 3050A-3050$n$ determines the selected variable configuration of the chassis 200.

In one or more aspects the chassis includes the transfer arm 210A that extends/retracts laterally relative to the payload support 210B where the transfer arm 210A may be movable in the vertical direction VER in any suitable manner by any suitable distance so that the transfer arm 210A is above/clears the chassis 200 when the transfer arm 210A is extended/retracted. The transfer arm 210A may be provided as a part of the payload support module 210M as described herein. In some aspects, the payload support 210B and transfer arm 210A are coupled to at least one payload support stanchion module 211, 212 (also referred to as a payload support stanchion) as described herein, where in some aspects the payload support stanchions 211, 212 are configured to move one or more of the payload support 21B and transfer arm 210A in vertical direction VER. In other aspects, the payload support 210B may be a static payload support 210SPS (FIG. 2C) without an actuated transfer arm 210A (and without vertical movement provided by the payload support stanchions 211, 212, although in some aspects vertical movement may be provided). In some aspect, the payload support stanchion modules 211, 212 may also be provided as a part of the payload support module 210M or as separate modules to which the payload support module 210M is coupled.

The front lateral beam 3000 and the rear lateral beam 3000 extend laterally in direction LAT. The longitudinal hollow section beams 3010 extend longitudinally in direction LON. The longitudinal hollow section beams 3010 are substantially similar to each other so that either longitudinal hollow section beam 3010 can be installed on either lateral side of the autonomous transport vehicle by reorienting (e.g., rotating by about 180 degrees) the longitudinal hollow section beams 3010 about a respective longitudinal axis RAX; however, in other aspects the longitudinal hollow section beam 3010 may be differently configured depending on which lateral side of the autonomous transport vehicle 110 the longitudinal hollow section beams 3010 are installed. Each longitudinal hollow section beam 3010 includes a first end 3010E1 configured to couple to the front lateral beam 3000 in any suitable manner (such as mechanical fasteners). The first end 3010E1 includes at least one datum surface 3091 that is configured to seat against a corresponding datum surface 3092A, 3092B of the front lateral beam 3000. Each longitudinal hollow section beam 3010 also includes a second end 3010E2 configured to couple to the rear lateral beam 3050 in any suitable manner (such as mechanical fasteners). Each second end 3010E2 has at least one datum surface 3093 that is configured to seat against a corresponding datum surface 3094A, 3094B of the rear lateral beam 3050. The longitudinal distance between the datum surface 3091 and the datum surface 3093 of each longitudinal hollow section beam 3010 is predetermined so that with the front lateral beam 3000 and the rear lateral beam 3050 coupled to the longitudinal hollow section beams 3010, e.g., to form the chassis 3099 having a longitudinal length 3099L and a lateral width 3099W, the components (e.g., sensors, actuators, etc.) of the front lateral beam 3000 and the rear lateral beam 3050 have a known positional/spatial relationship relative to each other. The chassis 3099 is illustrated in FIG. 3B without sub-components (e.g., wheels, electronics, etc.) thereon for clarity. In some aspects, the longitudinal hollow section beams 3010 include identifying indicia (radio frequency identification tags, etc.) that inform the controller 1220 of the length (between datum surfaces 3091, 3093) of the respective longitudinal hollow section beam 3010. The identifying indicia are read by suitable sensors of the controller 1220 of the autonomous transport vehicle 110 to effect a plug and play positional/spatial relationship between the autonomous vehicle components by the controller 1220 as described herein. In other aspects, the length (between datum surfaces 3091, 3093) of the respective longitudinal hollow section beam 3010 may be input to the controller 1220 manually through any suitable user interface of the autonomous transport vehicle 110.

In one or more aspects, the length 3099L and/or width 3099W of the chassis 3099 is selectable from a number of different lengths and/or widths (e.g., effected through a selection of different longitudinal hollow section beam 3010A-3010n having different lengths LR1-LRn and/or a selection of different front and rear lateral beams 3000A-3000n, 3050A-3050n having different widths CW1-CWn, DW1-DWn) so as to enlarge or reduce payload capacity of the autonomous transport vehicle 110. For example, the length 3099L is increased or decreased depending on, for example, a maximum length of case units handled by the autonomous transport vehicle 110. Similarly, the width 3099W is increased or decreased depending on, for example, a maximum width of case units handled by the autonomous transport vehicle 110. The length 3099L and/or width 3099W may also be increased or decreased so as to increase the wheel base WB and/or wheel track WT (see FIG. 4) depending one or more of, for example, structural size constraints imposed on the autonomous transport vehicle 110 by structure of the storage and retrieval system 100 (e.g., picking aisle width, turning radius, etc.), ride quality of the autonomous transport vehicle (e.g., longer wheel base provides less jostling of goods being transported), and transport speeds (e.g., wider wheel track provides greater stability in turns). In other aspects, the length 3099L and/or width 3099W may be increased or decreased for any suitable reasons. The length 3099L of the chassis 3099 is selected through a selection of a number of different longitudinal hollow section beam 3010A-3010n each having a respective length LR1-LRn (where "n" is an integer denoting a maximum number for the selection).

The width 3099W of the chassis 3099 is selected through a selection of a number of different front lateral beams 3000A-3000n each having a respective width CW1-CWn and a corresponding one of a number of different rear lateral beams 3050A-3050n each having a respective width DW1-DWn. In some aspects, the front and rear lateral beams 3000, 3050 each include identifying indicia (radio frequency identification tags, etc.) that inform the controller 1220 of at least the width (between datum surfaces 3072D, 3073D or 3074D, 3075D—FIG. 3A) of the respective front and rear lateral beams 3000, 3050. The identifying indicia are read by suitable sensors of the controller 1220 of the autonomous transport vehicle 110 to effect a plug and play positional/spatial relationship between the autonomous vehicle components by the controller 1220 as described herein. In other aspects, the width (between datum surfaces 3072D, 3073D or 3074D, 3075D) of the respective front and rear lateral beams 3000, 3050 may be input to the controller 1220 manually through any suitable user interface of the autonomous transport vehicle 110.

While the rear lateral beams 3050A-3050n are illustrated as having the drive wheels 260A, 260B installed thereon, in one or more aspects the drive wheels 260A, 260B may be installed, as drive wheel modules 260M, on the rear lateral beams 3050A-3050n prior to coupling of the rear lateral beams 3050A-3050n to the longitudinal hollow section beam 3010. In other aspects, the drive wheels 260A, 260B may be installed, as drive wheel modules 260M, on the rear lateral beams 3050A-3050n post coupling of the rear lateral beams 3050A-3050n to the longitudinal hollow section beam 3010.

Figure 3C:
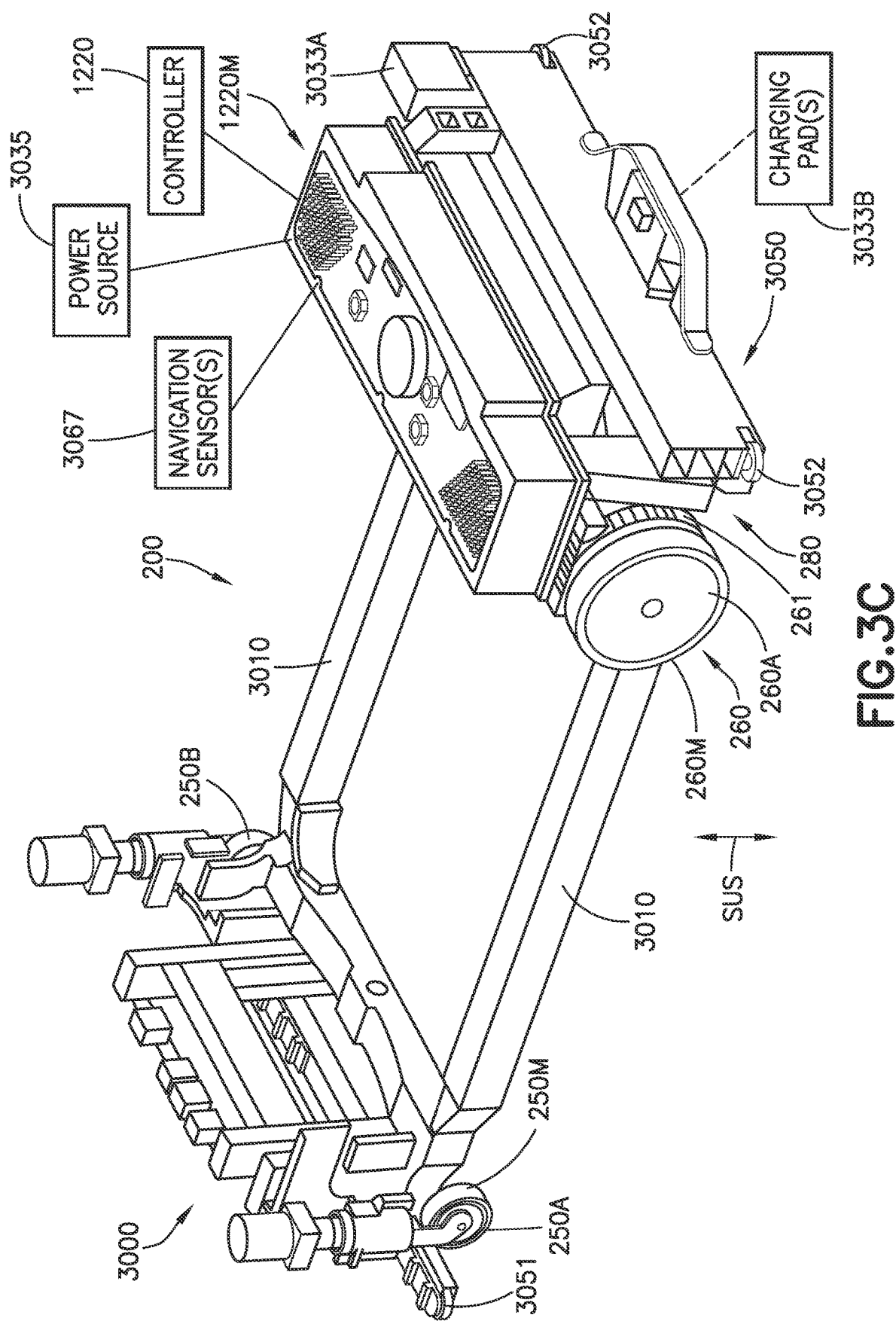
FIG. 3C is a schematic perspective illustration of a portion of the exemplary autonomous transport vehicle of FIG. 2A in accordance with aspects of the disclosed embodiment.

In one or more aspects, the rear lateral beams 3050A-3050n are provided as selectable modular assemblies that include the drive wheels 260 (which may themselves be provided as drive wheel module 260M sub-assemblies that are selected from a number of different modular drive wheel assemblies 260A1-260An, 260B1-260Bn and installed to the selectable modular rear lateral beam assembly), electronics (controllers, electronic busses, wire harnesses, sensors, etc.), and auxiliary equipment (e.g., charging interfaces, switches, interface ports, etc.). For example, as can be seen in FIGS. 2A, 2B and 3C the rear lateral beam 3050 includes one or more of any suitable power source 3035 (e.g., ultra-capacitor, battery, etc.), drive wheels 260, any suitable controller 1220 (and associated electronics), guide rollers 3052, one or more suitable navigation sensors 3067

(e.g., line following sensors, vision sensors, sonic sensors, etc.), and charging interface 3033 (e.g., side-mount bus bar contact pad 3033A and/or under-mount charging pads 3033B). The longitudinal hollow section beam 3010 and/or payload support stanchions 211, 212 are mechanically coupled to the cross member 3050 assembly as described herein.

The front lateral beam 3000 is, in one or more aspects, provided as an assembly that includes one or more of the caster wheels 250 (which may themselves be provided as modular sub-assemblies that are selected from a number of different modular caster wheel assemblies 250A1-250An, 250B1-250Bn), electronics (sub-controllers, electronic busses, wire harnesses, motors, sensors, etc.), and/or auxiliary equipment (e.g., charging interfaces, switches, interface ports, etc.) For example, as can be seen in FIGS. 2A, 2B and 3C the front lateral beam 3000 includes idler wheels 250, a drive motor 290 for moving a carrier 290 of the payload support stanchions 211, 212 in direction VER (such as where the payload support 210B is an actuated payload support), guide rollers 3051, one or more suitable navigation sensors 3066 (e.g., line following sensors, vision sensors, sonic sensors, etc.), and/or any suitable couplings that facilitate a substantially plug-and-play connection of the components of the front lateral beam 3000 to at least the controller 1220 of the rear lateral beam 3050. In other aspects, the front lateral beam 3000 may also include a charging interface substantially similar to charging interface 3033. In still other aspects, the caster wheels 250, electronics, and/or auxiliary equipment may be coupled to the front lateral beam 3000 after the front lateral beam 3000 is coupled to the longitudinal hollow section beam 3010 and/or payload support stanchions 211, 212. While the front lateral beam 3000 is described above as a module including the caster wheels 250A, 250B, in one or more aspects the drive caster wheels 250A, 250B may be installed on the front lateral beam 3000 prior to or post coupling of the front lateral beam 3000 to the longitudinal hollow section beam 3010.

The at least one payload support stanchion 211, 212 is/are coupled to chassis 3099 so that each payload support stanchion 211, 212 is removed from and installed to the chassis 3099 in a modular manner. In the example illustrated in FIGS. 2A, 2B, there is one payload support stanchion 212 disposed at or adjacent end 200E2 of the chassis 200 and another payload support stanchion 211 disposed at or adjacent end 200E1 of the chassis 200; however, in other aspects there may be one payload support stanchion or more than two payload support stanchions. Referring to FIGS. 2A, 2B, 3A, and 3B, the payload support stanchions are substantially similar to each other such that payload support stanchion 212 may be coupled to the chassis 3099 at or adjacent end 200E1 and payload support stanchion 211 may be coupled to the chassis 3099 at or adjacent end 200E2. In one or more aspects, rotation of the payload support stanchions about a respective (vertical) axis TAX facilitates placement of the either payload support stanchion 211, 212 at either one of ends 200E1, 200E2. The payload support stanchions 211, 212 are coupled to the chassis 3099 by inserting the payload support stanchions 211, 212 into corresponding receptacles/interfaces 3070, 3071 of a respective front lateral beam 3000 and rear lateral beam 3050. The receptacles 3070, 3071 of the front lateral beam 3000 and the rear lateral beam 3050 form datum surfaces that are in a known spatial relationship with one or more of the datum surfaces 3091, 3093 so as to position the respective payload support stanchion 211, 212 (and payload support contact surface 210BS coupled thereto) in a known predetermined location relative to the components (e.g., actuators, sensors, etc.) of the front lateral beam 3000 and the rear lateral beam 3050. As may be realized, the receptacles 3070, 3071 position the payload support contact surface 210BS at the height LPH2 described herein. The receptacles 3070, 3071 are configured to orient the respective payload support stanchion 211, 212 so that the payload support stanchions 211, 212 extend substantially parallel with each other in the lateral direction LAT and so that the payload support stanchions 211, 212 extend substantially parallel with each other in the vertical direction VER. The payload support stanchions 211, 212 are coupled to a respective one of the front lateral beam 3000 and rear lateral beam 3050 in a removable manner, such as by mechanical fasteners; however, in other aspects, the payload support stanchions 211, 212 are coupled to the longitudinal hollow section beam 3010 and serve as additional frame cross members (e.g., increasing torsional stiffness of the chassis 200); while in still other aspects the payload support stanchions 211, 212 are coupled to both the respective one of the front lateral beam 300 and the rear lateral beam 3050 and the longitudinal hollow section beam 3010.

The payload support stanchions 211, 212 are selectable from a number of different payload support stanchions 212A-212n each having a respective height TH1-THn and width TW1-TWn, where the widths TW1-TWn of the payload support stanchions 212 correspond with (and are selected depending on) the widths of the number of different front lateral beams 3000A-3000n and the number of different rear lateral beams 3050A-3050n. The height TH1-THn of the number of different payload support stanchions 212A-212n is selected depending on, for example, heights of case unit holding locations/shelves of the storage and retrieval system 100 at which the autonomous transport vehicle 110 transfers case units.

The payload support stanchions 211, 212 are, in one or more aspects, provided as modular assemblies. For example, referring to FIGS. 2A, 2B, and 3A, each payload support stanchion includes a tower frame 300F. The tower frame 300F includes a base 305, vertical guides 306, 307, and a cross brace or brace 308. The carrier 290 extends laterally between and is guided in vertical movement by the vertical guides 306, 307. The carrier 290 moves vertically in direction VER between the base 305 and brace 308 under motive force of any suitable drive motor 390 that is coupled to the carrier 290 by any suitable flexible transmission 330 (e.g., such as a drive shaft, gear box, belts, chains, and/or cables and associated pulleys/sprockets, etc.) where the transmission is coupled to an axle PXL tower frame 300F. In one aspect, the drive motor 390 is a rotary motor coupled to the carrier 290 through the flexible transmission 330; while in other aspects the drive motor 390 may be a linear motor (e.g., any suitable electric, hydraulic, and/or pneumatic linear actuator) coupled to the carrier 290 for moving the carrier 290 in direction VER. As described herein, the carrier 290 is coupled to and supports the payload support 210 and the transfer arm 210A of the payload support 210 for movement in direction VER.

Figure 6:
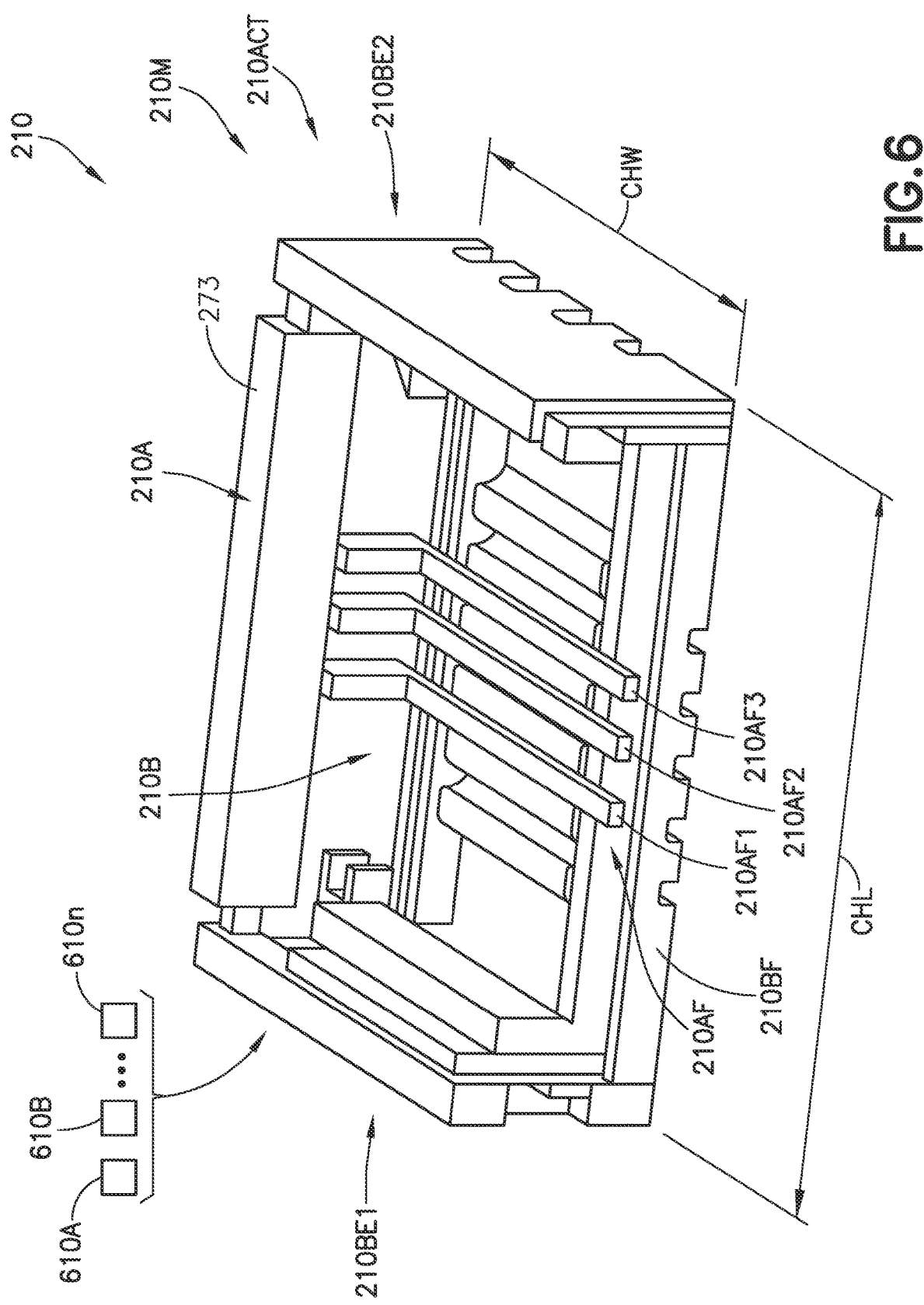
FIG. 6 is a perspective illustration of a portion of the exemplary autonomous transport vehicle of FIG. 2A in accordance with aspects of the disclosed embodiment.

Referring to FIGS. 2A, 2B, and 6 the payload support 210 is a modular unit/assembly (e.g., the payload support module 210M) that includes at least the payload bed 210B. Where the payload support 210 comprises the static payload support 210SPS the payload support 210 is coupled substantially directly to the chassis 200 in a manner similar to that described above with respect to the payload support stanchions 211, 210 (e.g., where the static payload support is received into the receptacles 3070, 3071) or statically coupled to the payload support stanchions 210, 211 (e.g., the payload support stanchions do not include vertical actuation). In other aspects, the static payload support 210SPS may be coupled to the payload support stanchions 211, 212 for vertical travel in direction VER in a manner substantially similar to that described herein with respect to active payload support 210ACT. The static payload support 210SPS is configured for a passive transfer of case units CU to and from the payload bed 210B. For example, the passive transfer, in one or more aspects, is with respect to the payload bed 210B (e.g., no lateral extension of the payload bed/arm to effect a transfer of the payload). The passive transfer with respect to the payload bed 210B is effected with an extending support (e.g., extendable slatted shelf that is separate and distinct from the vehicle 110) that interfaces with the raised payload bed so that lowering of the payload bed transfers the payload to the extending support (e.g., the payload bed is configured so that the extending support, or a portion thereof, passes through (such as in an interdigitated manner) the payload bed 210B upon lowering of the payload bed 210B. Here, the raised payload bed may be positioned relative to extended support in any suitable manner, such as with a traverse motion of the vehicle 110 in direction LON along a picking aisle or transfer deck so that the extendable support extends to intervene between the raised payload bed 210B and the chassis 200 (where lowering the payload bed passively transfers the payload to the extended support). In one or more aspects, the drive wheels of the vehicle 110 may be omnidirectional wheels that are configured (in combination with rotation or yawing of the caster wheels) to move the vehicle 110 in a lateral traverse motion (e.g., in direction LAT). Here, the lateral traverse motion of the vehicle 110 provides for the raised payload bed 210B to be positioned over a static support (i.e., the support is fixed in place and does not move) by at least the lateral traverse motion of the vehicle 110 in direction LAT such that the static support intervenes between the raised payload bed 210B and the chassis 200 (where lowering the payload bed passively transfers the payload to the extended support). As may be realized, passive transfer of payload to the vehicle 110 may occur in an opposite manner to that described above.

Where the payload support 210 is an active payload support 210ACT (FIG. 6), the payload support 210 includes transfer arm 210A. In this aspect, the payload bed 210B is coupled to the at least one payload support stanchion 211, 212. The at least one payload support stanchion is configured to move the payload bed 210B and/or transfer arm 210A in direction VER; while in other aspects substantial vertical movement of the payload bed 210B and/or transfer arm 210A may not be provided in direction VER. The transfer arm 210A is movably coupled to the payload bed 210B for lateral movement in direction LAT.

The payload bed 210B includes a payload bed frame 210BF that forms a payload area in which case units CU carried by the bot 110 are disposed for transport throughout the storage and retrieval system 100. The payload bed frame 210BF includes longitudinal ends 210BE1, 210BE2 that are each coupled to a respective one of the at least one payload support stanchion 211, 212. Here the at least one payload support stanchion 211, 212 includes payload support stanchion 211 disposed at or adjacent the front end 200E1 of the chassis 200 and payload support stanchion 212 disposed at or adjacent the back end 200E2 of the chassis 200. Here, each payload support stanchion 211, 212 includes the movable carrier 290 to which a respective one of the longitudinal ends 210BE1, 210BE2 is fixedly coupled in any suitable manner such as mechanical or chemical fasteners (i.e., so that as the movable carrier 290 moves the payload bed frame 210BF moves with the movable carrier 290). The payload support 210 is coupled to and removed from the carriers 290 of the payload support stanchions 211, 212 in any suitable manner, such as by any suitable mechanical fasteners.

As noted herein, the payload support 210 is provided as a modular assembly (e.g., payload support module 210M) that is selected from a number of different interchangeable payload support modules 610A-610n (it is noted that while FIG. 6 illustrates an active payload support 210ACT assembly it should be realized different modular static payload support 210SPS may also be provided), each payload support module having a different predetermined payload support module characteristic (e.g., active case transfer (payload bed with end effector/transfer arm), passive case transfer (payload bed without actuated end effector/transfer arm as described herein), lift capability, length, width, different size payload actuators for different sized payload, etc.). The different payload support modules 610A-610n have longitudinal lengths CHL and lateral widths CHW that correspond with the longitudinal length 3099L and a lateral width 3099W of the chassis 3099 (as effected through selection of the front lateral beams 3000A-3000n, the rear lateral beams 3050A-3050n, the longitudinal hollow section beams 3010A-3010n, and the payload support stanchions 212A-212n). In this manner one of the payload support modules 610A-610n is selected depending on a predetermined chassis configuration for installation to the chassis 3099 in a modular manner (i.e., the selected payload support 210 is coupled to the carriers 290 substantially without modification to either the payload support 210, the payload support stanchions 211, 212, and the chassis 3099). The different payload support modules 610A-610n may also be selected depending on whether the autonomous transport vehicle 110 is to be configured for active or passive case transfer CU to and from the payload bed 210B. In one or more aspects, the payload support stanchions 211, 212 form a portion of a respective different interchangeable payload support modules 610A-610n, where the payload support stanchions 211, 212 are pre-assembled to the longitudinal ends 210BE1, 210BE2 (see FIG. 6) of the payload bed frame 210BF so that the payload support stanchions 211, 212 form a modular unit with the payload support 210. Here, the modular combination of the payload support stanchions 211, 212 and the payload support 210 are selected from the different interchangeable payload support modules 610A-610n and coupled to the chassis 3099 as a payload support modular unit.

The transfer arm 210A includes one or more fingers 210AF that are each cantilevered from a finger support rail 273 of the transfer arm 210A. It is noted that while three fingers 210AF1-210AF3 are illustrated for exemplary purposes only, in other aspects there may be more or fewer than three fingers spaced apart from one another (with any suitable spacing) along the finger support rail 273. The finger support rail 273 of the transfer arm 210A is movably coupled to the payload bed frame 210BF in any suitable manner so that the transfer arm 210A (inclusive of the finger support rail 273 and the one or more fingers 210A1-210A3) moves relative to the payload bed frame in direction LAT. Movement of the transfer arm 210A in direction LAT extends and retracts the one or more fingers 210AF for picking and placing payloads to and from the payload bed 210B.

Referring to FIGS. 2A, 2B, 3A, 3C and 4, as described above, the ride wheels 250, 260 include the drive wheels 260A, 260B and idler wheels 250A, 250B. Each of the drive wheels 260A, 260B and idler wheels 250A, 250B are provided as modular components (e.g., drive wheel modules 260M and idle/caster wheel modules 250M) that can each be independently removed from and installed to the chassis 200 as respective modular units in a plug-and-play manner so as to be swapped with other selectable drive wheels 260 and idler wheels 250. For example, idler wheel 250A is selectable from a number of different idler wheels 250A1-250An each having a different characteristic or combination of characteristics (e.g., wheel diameter, ride height, wheel tread pattern, wheel material, motorized (steerable) casters, non-motorized (passive) casters, suspension preload (which may be preset at different levels before mounting to configure the vehicles 110 with different payload capacities), etc.). Idler wheel 250B is similarly selectable. Drive wheel 260B is selectable from a number of different drive wheels 260B1-260Bn each having a different characteristic or combination of characteristics (e.g., wheel diameter, ride height, wheel tread pattern, wheel material/friction coefficient, motor horsepower, motor operational speed, suspension preload (which may be preset at different levels before mounting to configure the vehicles 110 with different payload capacities), etc.).

The idler wheels 250A, 250B are coupled to the front lateral beam 3000 at a respective coupling interface 3074, 3075 in a removable manner such as with mechanical fasteners. Each of the coupling interfaces 3074, 3075 include a datum surfaces 3074D, 3075D at which the idler wheels 250A, 250B are coupled to the space frame 200S in a repeatable and known location relative to the sensors, actuators, etc. of the front and rear crossmembers 3000, 3050 (and the components of the interchangeable payload support modules 610A-610n). For example, the datum surfaces 3074D, 3075D of the space frame 200S seat against and locate mating datum surfaces 250DS of the respective idler wheel 250A, 250B relative to the space frame 200S (see FIG. 3A) so that the idler wheels 250A, 250B can be coupled to and removed from the space frame 200S in a plug-and-play manner.

Figure 4:
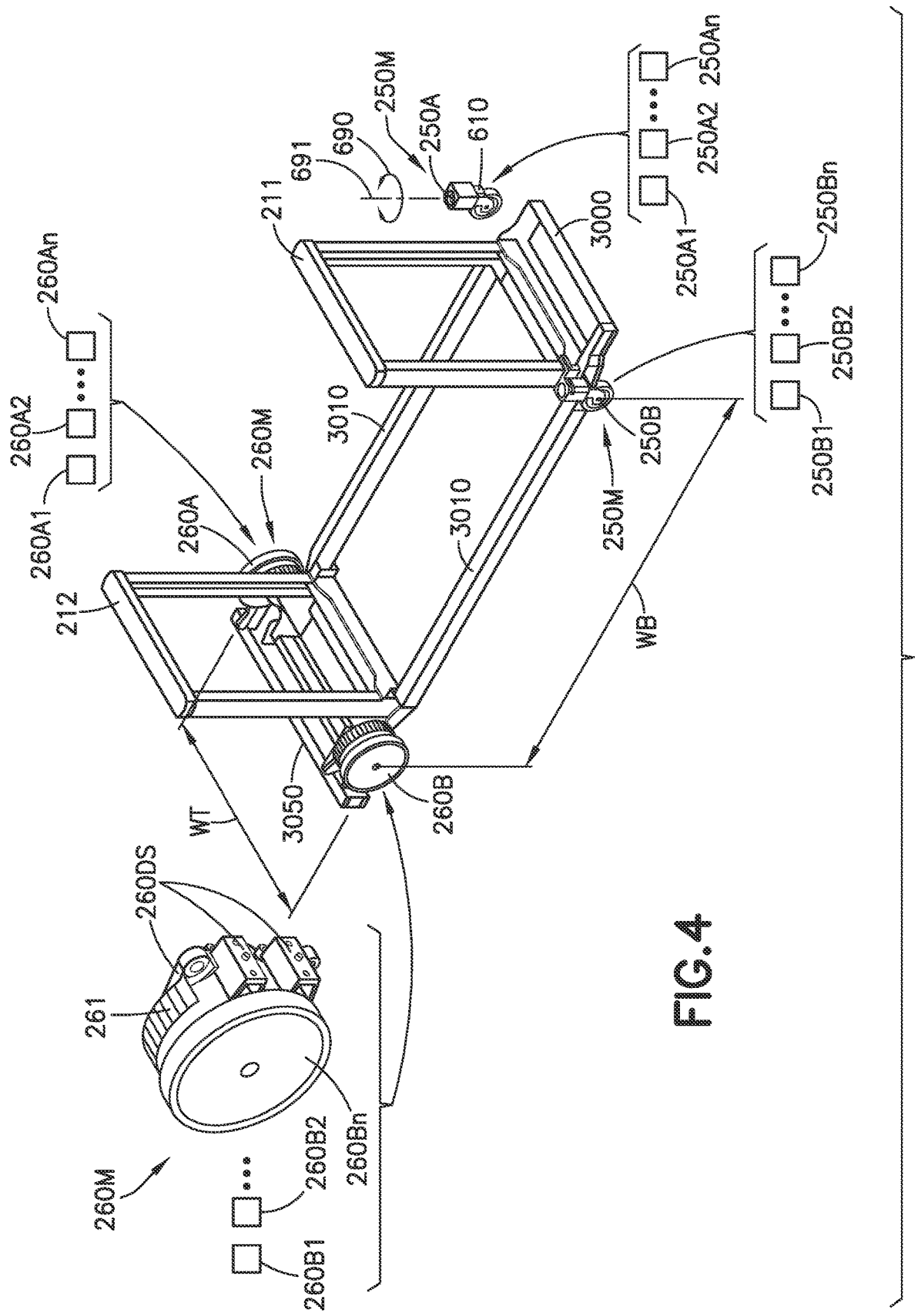
FIG. 4 is a partial exploded illustration of a portion of the exemplary autonomous transport vehicle of FIG. 2A in accordance with aspects of the disclosed embodiment.

The drive wheels 260A, 260B are coupled to the rear lateral beam 3000 at a respective coupling interface 3072, 3073 in a removable manner such as with mechanical fasteners. Here, there are separate and distinct interfaces 3072, 3073 for respective separate and distinct drive wheel modules 260M of each different drive wheel 260A, 260B of a pair of drive wheels. Each of the coupling interfaces 3072, 3073 include a datum surfaces 3072D, 3073D at which the drive wheels 260A, 260B are coupled to the space frame 200S in a repeatable and known location relative to the sensors, actuators, etc. of the front and rear crossmembers 3000, 3050 (and the components of the interchangeable payload support modules 610A-610n). For example, the datum surfaces 3072D, 3073D of the space frame 200S seat against and locate mating datum surfaces 260DS of the respective drive wheel 260A, 260B so as to locate the drive wheels 260A, 260B in the known predetermined location relative to the space frame 200S (see FIGS. 3A and 4) so that the drive wheels 260A, 260B can be coupled to and removed from the space frame 200S in a plug-and-play manner. It is noted that while the drive wheel module 260M is illustrated in FIG. 4 as being sans suspension components, in other aspects the drive wheel module 260M may include at least part of suspension system 280 (e.g., control arm(s) and shock absorber mounted to a datum plate that is coupled to the rear crossmember 3050).

Figure 5:
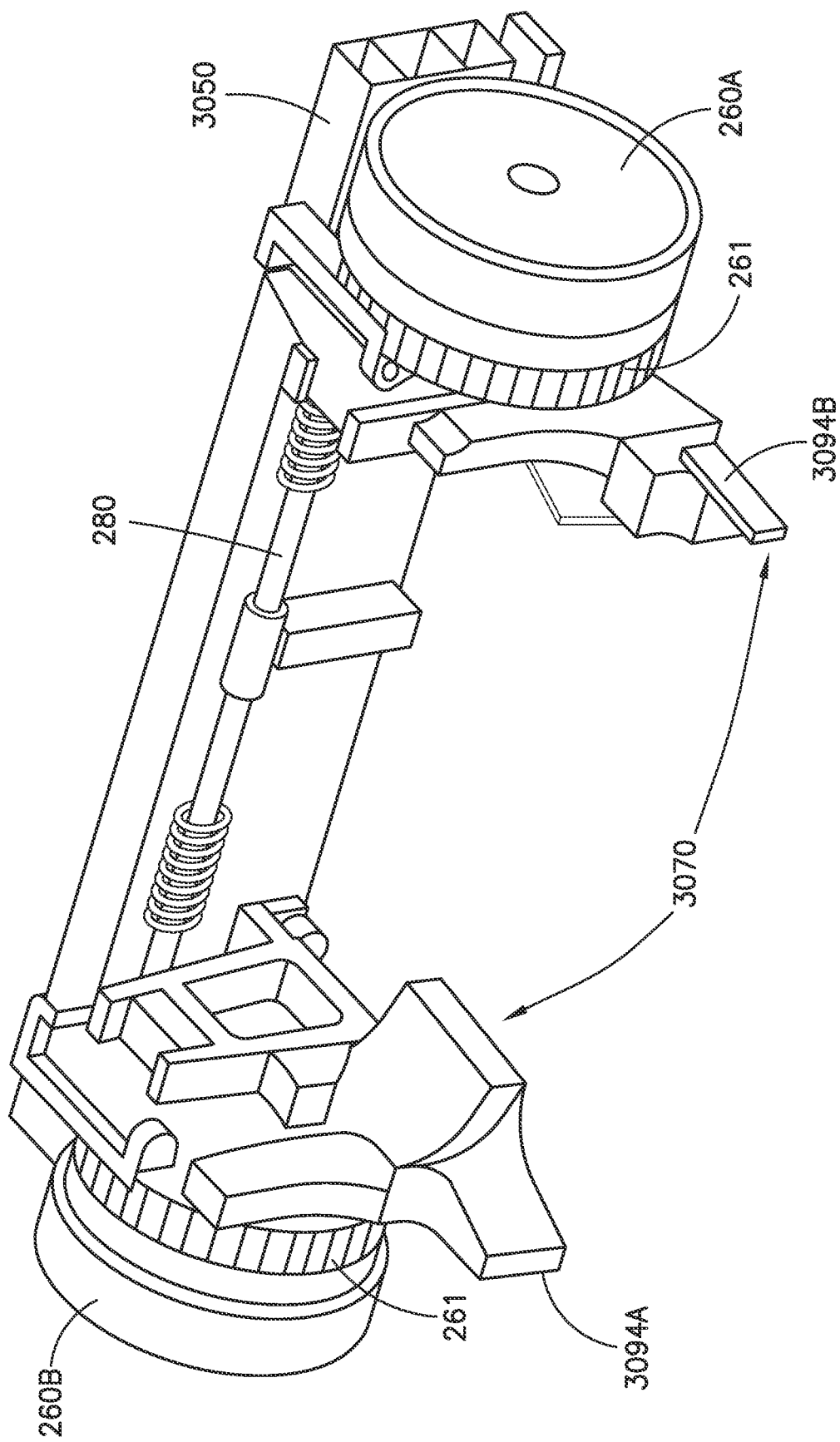
FIG. 5 is a perspective illustration of a portion of the exemplary autonomous transport vehicle of FIG. 2A in accordance with aspects of the disclosed embodiment.

Here, the chassis 200 includes one or more idler wheels 250 disposed adjacent the front end 200E1. In one aspect, an idler wheel 250 is located adjacent each front corner of the chassis 200 so that in combination with the drive wheels 260 (the drive wheels 310 being disposed at each rear corner of the chassis 200) the chassis 200 stably traverses the transfer deck 130B and picking aisles 130A of the storage structure 130. Each idler wheel 250 comprises any suitable un-motorized/passive caster or a motorized caster that is configured to actively pivot the wheel 610 in direction 690 about caster pivot axis 691 (see FIG. 4) to at least assist in effecting a change in the travel direction of the autonomous transport vehicle 110. Each drive wheel 260 comprises a drive unit 261 (see, e.g., FIG. 4) that is independently coupled to the chassis 200 by a respective independent suspension system 280 (see FIGS. 3C and 5), so that each drive wheel 260 is independently movable (e.g., independently driven by a respective drive motor of a respective drive unit) in a wheel travel direction SUS relative to the chassis 200 and any other drive wheel(s) 260 that is/are also coupled to the chassis 200.

As described herein the drive wheels 260, the idler wheels 250, and payload support 210 are provided as modular components (e.g., the drive wheel modules 260M, the idler/caster wheel modules 250M, and the payload support module 210M) that can each be independently removed from and installed to the chassis 200 as respective modular units in a plug-and-play manner so as to be swapped with other selectable the drive wheels 260, the idler wheels 250, and payload support 210. For example, the autonomous transport vehicle 110 includes any suitable onboard communications backbone such as a controller area network (CAN) that communicably couples the controller 1220 to the electronic components (e.g., sensors, motors, and other suitable sensors/actuable components) of the autonomous transport vehicle 110. The controller area network is configured such that each of the modular drive wheels 260, the modular idler wheels 250 (such as where the idler wheels include actuable components such as steering motors, locks, etc.), and modular payload support 210 releasably plug into the controller area network (e.g., so that electronic components thereof are in communication with the controller 1220) and include any suitable identification protocol (e.g., digital signature) that is communicated to the controller 1220 over the controller area network upon connection of the modular drive wheels 260, the modular idler wheels 250, and modular payload support 210 to the controller area network. The identification protocol may identify types of sensors, motors specifications, actuator travel limits (such as for lifting case units), and/or any other suitable operation specifications that effect operation of the respective one of the modular drive wheels 260, the modular idler wheels 250, and modular payload support 210 coupled to the controller 1220 through the controller area network. The identification protocol also identifies the position at which the modular drive wheels 260, the modular idler wheels 250, and modular payload support 210 are coupled to the chassis, where the controller 1220 determines the location of the sensors, actuators, etc. of the modular components based on the location of the respective datum surfaces of the respective coupling interfaces 3070, 3071, 3072, 3073, 3074, 3075 and data obtained from the modular components in the identification protocol. The controller 1220 is configured (e.g., through suitable non-transitory computer program code) to receive the identification protocol from the modular drive wheels 260, the modular idler wheels 250, and/or modular payload support 210 and effect operation of the modular drive wheels 260, the modular idler wheels 250, and/or modular payload support 210 based, at least in part, on the operational data embodied in the identification protocol.

Figure 7:
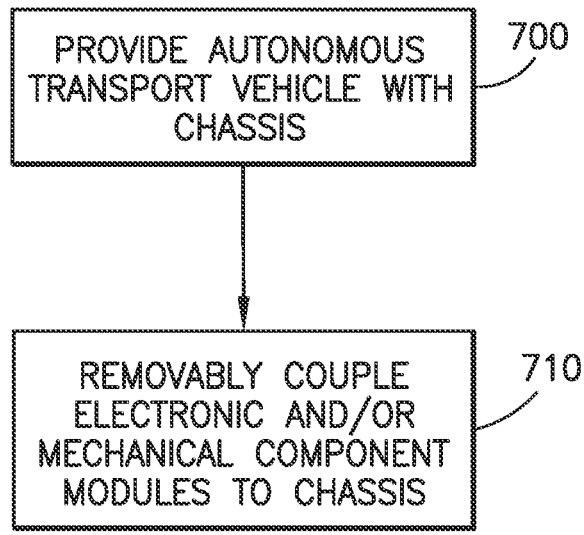
FIG. 7 is an exemplary block diagram of a method in accordance with aspects of the disclosed embodiment.
Figure 8:
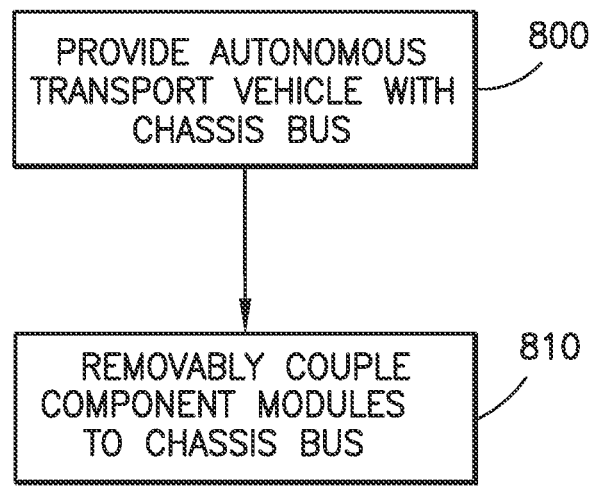
FIG. 8 is an exemplary block diagram of a method in accordance with aspects of the disclosed embodiment.

Referring to FIGS. 2A-2C, 3A-3C, 6, and 7 an exemplary method will be described in accordance with aspects of the disclosed embodiment. In the method the autonomous transport vehicle 110 is provided with the chassis 200 (forming the space frame 200S), payload support 210, and ride wheels 250, 260 (FIG. 7, Block 700). As described herein, the ride wheels 250, 260 and chassis 200 in combination form the low profile height LPH from the traverse surface TS to atop 200T the chassis 200, where chassis height 200H and ride wheel height 250H, 260H are overlapped at least in part and the payload support 210 is nested within the ride wheels 260 (e.g., between the ride wheels 250, 260 such that the low profile height LPH is smaller than one or more of the ride wheel height 250H, 260H). A corresponding electronic and/or mechanical component module (e.g., ride wheel modules (e.g., at least one drive wheel module 260M and at least one caster wheel module 250M), payload support module 210M, control module 1220M, etc., as described herein) are removably coupled, as a modular unit, to the space frame 200S (FIG. 7, Block 710) with the predetermined modular coupling interfaces 3070, 3071, 3072, 3073, 3074, 3075 described herein.

Referring to FIGS. 2A-2C, 3A-3C, 6, and 8 another exemplary method will be described in accordance with aspects of the disclosed embodiment. In the method the autonomous transport vehicle 110 is provided with the chassis bus (also referred to as chassis) 200 (FIG. 8, Block 800), where the chassis bus 200 includes the predetermined modular coupling interfaces 3070, 3071, 3072, 3073, 3074, 3075 described herein. Corresponding predetermined component modules of the autonomous transport vehicle 110 are removably coupled, as a module unit, to the chassis bus 200 (FIG. 8, Block 810) so that the autonomous transport vehicle 110 has a modular construction. Here, the predetermined component modules include at least one of: a payload support module 210M with a payload support contact surface 210BS removably coupled as a module unit to the chassis bus 200 with a corresponding payload support module coupling interface 3070, 3071; a caster wheel module 250M with a caster wheel 250A, 250B removably coupled as a module unit to the chassis bus 200 with a corresponding caster wheel module coupling interface 3074, 3075; and a drive wheel module 260M with a drive wheel 260A, 260B removably coupled as a module unit to the chassis bus 200 with a corresponding drive wheel module coupling interface 3072, 3073.

In accordance with one or more aspects of the disclosed embodiment, an autonomous transport robot vehicle for transporting a payload is provided. The autonomous transport robot vehicle comprises:
a chassis that is a space frame formed of:
longitudinal hollow section beams, arrayed to form longitudinally extended sides of the space frame, and
respective front and rear lateral beams closing opposite ends of the space frame;
a payload support connected to the chassis and dependent therefrom; and
ride wheels dependent from the chassis, proximate opposite end corners of the chassis, on which the autonomous transport robot vehicle rides so as to traverse a traverse surface, the ride wheels include at least one caster wheel and a pair of drive wheels supporting the chassis from the traverse surface, and
wherein the ride wheels and chassis in combination form a low profile height from the traverse surface to atop the chassis, where chassis height and ride wheel height are overlapped at least in part and the payload support is nested within the ride wheels; and
wherein the space frame has predetermined modular coupling interfaces, each disposed for removably coupling, as a module unit, a corresponding predetermined electronic or mechanical component module of the autonomous transport robot vehicle to the chassis.

In accordance with one or more aspects of the disclosed embodiment, the predetermined modular coupling interfaces include at least one of at least one caster wheel module coupling interface, at least one drive wheel module coupling interface, and at least one payload support module coupling interface.

In accordance with one or more aspects of the disclosed embodiment the at least one caster wheel is selectable from a number of different selectably interchangeable caster wheel modules, each with a different predetermined caster wheel module characteristic.

In accordance with one or more aspects of the disclosed embodiment, drive wheels of the pair of drive wheels are selectable from a number of different selectably interchangeable drive wheel modules, each with a different predetermined drive wheel module characteristic.

In accordance with one or more aspects of the disclosed embodiment, the payload support is selectable from a number of different interchangeable payload support modules, each with a different predetermined payload support module characteristic.

In accordance with one or more aspects of the disclosed embodiment the at least one drive wheel module coupling interface includes separate and distinct interfaces for respective separate and distinct drive wheel modules of each different drive wheel of the pair of drive wheels.

In accordance with one or more aspects of the disclosed embodiment, the longitudinal hollow section beams and the respective front and rear lateral beams of the space frame are mechanically fastened to each other.

In accordance with one or more aspects of the disclosed embodiment the payload support comprises a payload support contact surface on which a payload resting on the payload support is seated, the payload support contact surface is disposed atop the chassis.

In accordance with one or more aspects of the disclosed embodiment, the space frame is configured so that the chassis is substantially rigid with predetermined rigidity characteristics, with a shape and form that provides a minimum height from the traverse surface to atop the chassis.

In accordance with one or more aspects of the disclosed embodiment, the space frame configuration resolves both predetermined rigidity characteristics and a minimum low profile height of chassis from the traverse surface to atop the chassis.

In accordance with one or more aspects of the disclosed embodiment the chassis has a selectably variable configuration, selectable from different configurations each having different chassis form factors.

In accordance with one or more aspects of the disclosed embodiment at least one of the longitudinal hollow section beams, the front lateral beam, and the rear lateral beam, is selectable from a number of different selectably interchangeable respective longitudinal hollow section beams, front lateral beams, and rear lateral beams each with different predetermined mechanical characteristics.

In accordance with one or more aspects of the disclosed embodiment selection of the at least one of the longitudinal hollow section beams, the front lateral beam, and the rear lateral beam from the number of different selectably interchangeable respective longitudinal hollow section beams, the front lateral beams, and the rear lateral beams determines the selected variable configuration of the chassis.

In accordance with one or more aspects of the disclosed embodiment, an autonomous transport robot vehicle for transporting a payload is provided. The autonomous transport robot vehicle comprises:
a chassis bus with predetermined modular coupling interfaces, each disposed for removably coupling, as a module unit, corresponding predetermined component modules of the autonomous transport robot vehicle to the chassis bus so that the autonomous transport robot vehicle has a modular construction; and
wherein the corresponding predetermined component modules include at least one of:
a payload support module with a payload support contact surface removably coupled as a module unit to the chassis bus with a corresponding payload support module coupling interface;
a caster wheel module with a caster wheel removably coupled as a module unit to the chassis bus with a corresponding caster wheel module coupling interface; and
a drive wheel module with a drive wheel removably coupled as a module unit to the chassis bus with a corresponding drive wheel module coupling interface.

In accordance with one or more aspects of the disclosed embodiment, the caster wheel module is selectable from a number of different selectably interchangeable caster wheel modules, each with a different predetermined caster wheel module characteristic.

In accordance with one or more aspects of the disclosed embodiment, the drive wheel module is selectable from a number of different selectably interchangeable drive wheel modules, each with a different predetermined drive wheel module characteristic.

In accordance with one or more aspects of the disclosed embodiment, the corresponding drive wheel module coupling interface includes separate and distinct interfaces for respective separate and distinct drive wheel modules.

In accordance with one or more aspects of the disclosed embodiment, the payload support module is selectable from a number of different interchangeable payload support modules, each with a different predetermined payload support module characteristic.

In accordance with one or more aspects of the disclosed embodiment the chassis bus is a space frame formed of:
longitudinal hollow section beams, arrayed to form longitudinally extended sides of the space frame, and
respective front and rear lateral beams closing opposite ends of the space frame.

In accordance with one or more aspects of the disclosed embodiment, the longitudinal hollow section beams and the respective front and rear lateral beams of the space frame are mechanically fastened to each other.

In accordance with one or more aspects of the disclosed embodiment, the space frame is configured so that the chassis bus is substantially rigid with predetermined rigidity characteristics, with a shape and form that provides a minimum height from a traverse surface to atop the chassis.

In accordance with one or more aspects of the disclosed embodiment, the space frame configuration resolves both predetermined rigidity characteristics and a minimum low profile height of chassis from a traverse surface to atop the chassis.

In accordance with one or more aspects of the disclosed embodiment at least one of the longitudinal hollow section beams, the front lateral beam, and the rear lateral beam, is selectable from a number of different selectably interchangeable respective longitudinal hollow section beams, front lateral beams, and rear lateral beams each with different predetermined mechanical characteristics.

In accordance with one or more aspects of the disclosed embodiment selection of the at least one of the longitudinal hollow section beams, the front lateral beam, and the rear lateral beam from the number of different selectably interchangeable respective longitudinal hollow section beams, the front lateral beams, and the rear lateral beams determines the selected variable configuration of the chassis.

In accordance with one or more aspects of the disclosed embodiment the autonomous transport robot vehicle includes at least one caster wheel module and at least one drive wheel module, the at least one caster wheel module and the at least one drive wheel module are dependent from the chassis bus, proximate opposite end corners of the chassis, where the autonomous transport robot vehicle rides on at least a caster wheel of the at least one caster wheel module and at least one drive wheel of the at least one drive wheel module so as to traverse a traverse surface.

In accordance with one or more aspects of the disclosed embodiment the at least one caster wheel, the at least one drive wheel, and the chassis bus in combination form a low profile height from the traverse surface to atop the chassis, where:
the at least one drive wheel comprises a pair of drive wheels and the at least one caster wheel comprises a pair of caster wheels,
a chassis height and a height of the at least one drive wheel are overlapped at least in part, and
the payload support contact surface, on which a payload resting on the payload support module is seated, is nested within the pair of drive wheel and the pair of caster wheels.

In accordance with one or more aspects of the disclosed embodiment the payload support contact surface, on which a payload resting on the payload support module is seated, is disposed atop the chassis bus.

In accordance with one or more aspects of the disclosed embodiment the chassis bus has a selectably variable configuration, selectable from different configurations each having different chassis form factors.

In accordance with one or more aspects of the disclosed embodiment a method comprises:
providing the autonomous transport robot vehicle with:
a chassis that is a space frame formed of:
longitudinal hollow section beams, arrayed to form longitudinally extended sides of the space frame, and
respective front and rear lateral beams closing opposite ends of the space frame,
a payload support connected to the chassis and dependent therefrom, and
ride wheels dependent from the chassis, proximate opposite end corners of the chassis, on which the autonomous transport robot vehicle rides so as to traverse a traverse surface, the ride wheels include at least one caster wheel and a pair of drive wheels supporting the chassis from the traverse surface, and
wherein the ride wheels and chassis in combination form a low profile height from the traverse surface to atop the chassis, where chassis height and ride wheel height are overlapped at least in part and the payload support is nested within the ride wheels; and removably coupling as a module unit, with predetermined modular coupling interfaces of the space frame, a corresponding predetermined electronic or mechanical component module of the autonomous transport robot vehicle to the chassis.

In accordance with one or more aspects of the disclosed embodiment, the predetermined modular coupling interfaces include at least one of at least one caster wheel module coupling interface, at least one drive wheel module coupling interface, and at least one payload support module coupling interface.

In accordance with one or more aspects of the disclosed embodiment the method further comprises selecting the at least one caster wheel from a number of different selectably interchangeable caster wheel modules, each with a different predetermined caster wheel module characteristic.

In accordance with one or more aspects of the disclosed embodiment the method further comprises selecting drive wheels of the pair of drive wheels from a number of different selectably interchangeable drive wheel modules, each with a different predetermined drive wheel module characteristic.

In accordance with one or more aspects of the disclosed embodiment, the method further comprises selecting the payload support from a number of different interchangeable payload support modules, each with a different predetermined payload support module characteristic.

In accordance with one or more aspects of the disclosed embodiment the at least one drive wheel module coupling interface includes separate and distinct interfaces for respective separate and distinct drive wheel modules of each different drive wheel of the pair of drive wheels.

In accordance with one or more aspects of the disclosed embodiment, the method further comprises mechanically fastening the longitudinal hollow section beams and the respective front and rear lateral beams of the space frame to each other.

In accordance with one or more aspects of the disclosed embodiment the payload support comprises a payload support contact surface on which a payload resting on the payload support is seated, the payload support contact surface is disposed atop the chassis.

In accordance with one or more aspects of the disclosed embodiment, the chassis is substantially rigid with predetermined rigidity characteristics, with a shape and form that provides a minimum height from the traverse surface to atop the chassis.

In accordance with one or more aspects of the disclosed embodiment, the space frame resolves both predetermined rigidity characteristics and a minimum low profile height of chassis from the traverse surface to atop the chassis.

In accordance with one or more aspects of the disclosed embodiment the method further comprises selecting a selectably variable configuration of the chassis from different configurations each having different chassis form factors.

In accordance with one or more aspects of the disclosed embodiment, the method further comprises selecting at least one of the longitudinal hollow section beams, the front lateral beam, and the rear lateral beam from a number of different selectably interchangeable respective longitudinal hollow section beams, front lateral beams, and rear lateral beams each with different predetermined mechanical characteristics.

In accordance with one or more aspects of the disclosed embodiment selection of the at least one of the longitudinal hollow section beams, the front lateral beam, and the rear lateral beam from the number of different selectably interchangeable respective longitudinal hollow section beams, the front lateral beams, and the rear lateral beams determines the selected variable configuration of the chassis.

In accordance with one or more aspects of the disclosed embodiment a method comprises:
providing the autonomous transport robot vehicle with a chassis bus with predetermined modular coupling interfaces; and
removably coupling as a module unit, with the predetermined modular coupling interfaces, corresponding predetermined component modules of the autonomous transport robot vehicle to the chassis bus so that the autonomous transport robot vehicle has a modular construction;
wherein the predetermined component modules include at least one of:
a payload support module with a payload support contact surface removably coupled as a module unit to the chassis bus with a corresponding payload support module coupling interface,
a caster wheel module with a caster wheel removably coupled as a module unit to the chassis bus with a corresponding caster wheel module coupling interface, and
a drive wheel module with a drive wheel removably coupled as a module unit to the chassis bus with a corresponding drive wheel module coupling interface.

In accordance with one or more aspects of the disclosed embodiment the method further comprises selecting the caster wheel module from a number of different selectably interchangeable caster wheel modules, each with a different predetermined caster wheel module characteristic.

In accordance with one or more aspects of the disclosed embodiment the method further comprises selecting the drive wheel module from a number of different selectably interchangeable drive wheel modules, each with a different predetermined drive wheel module characteristic.

In accordance with one or more aspects of the disclosed embodiment, the drive wheel module coupling interface includes separate and distinct interfaces for respective separate and distinct drive wheel modules.

In accordance with one or more aspects of the disclosed embodiment, the method further comprises selecting the payload support module from a number of different interchangeable payload support modules, each with a different predetermined payload support module characteristic.

In accordance with one or more aspects of the disclosed embodiment the chassis bus is a space frame formed of:
longitudinal hollow section beams, arrayed to form longitudinally extended sides of the space frame, and
respective front and rear lateral beams closing opposite ends of the space frame.

In accordance with one or more aspects of the disclosed embodiment, the method further comprises mechanically fastening the longitudinal hollow section beams and the respective front and rear lateral beams of the space frame to each other.

In accordance with one or more aspects of the disclosed embodiment, the space frame is configured so that the chassis is substantially rigid with predetermined rigidity characteristics, with a shape and form that provides a minimum height from a traverse surface to atop the chassis.

In accordance with one or more aspects of the disclosed embodiment, the space frame configuration resolves both predetermined rigidity characteristics and a minimum low profile height of chassis from a traverse surface to atop the chassis.

In accordance with one or more aspects of the disclosed embodiment, the method further comprises selecting at least one of the longitudinal hollow section beams, the front lateral beam, and the rear lateral beam from a number of different selectably interchangeable respective longitudinal hollow section beams, front lateral beams, and rear lateral beams each with different predetermined mechanical characteristics.

In accordance with one or more aspects of the disclosed embodiment selection of the at least one of the longitudinal hollow section beams, the front lateral beam, and the rear lateral beam from the number of different selectably interchangeable respective longitudinal hollow section beams, the front lateral beams, and the rear lateral beams determines the selected variable configuration of the chassis.

In accordance with one or more aspects of the disclosed embodiment the autonomous transport robot vehicle includes at least one caster wheel module and at least one drive wheel module, the at least one caster wheel module and the at least one drive wheel module are dependent from the chassis bus, proximate opposite end corners of the chassis, where the autonomous transport robot vehicle rides on at least caster wheel of the at least one caster wheel module and at least one drive wheel of the at least one drive wheel module so as to traverse a traverse surface.

In accordance with one or more aspects of the disclosed embodiment the caster wheel, the drive wheel, and the chassis bus in combination form a low profile height from the traverse surface to atop the chassis, where:
  the at least one drive wheel comprises a pair of drive wheels and the at least one caster comprises a pair of caster wheels,
  a chassis height and a height of the at least one drive wheel are overlapped at least in part, and
  the payload support contact surface, on which a payload resting on the payload support module is seated, is nested within the pair of drive wheel and the pair of caster wheels.

In accordance with one or more aspects of the disclosed embodiment the payload support contact surface, on which a payload resting on the payload support module is seated, is disposed atop the chassis bus.

In accordance with one or more aspects of the disclosed embodiment the method further comprises selecting a selectably variable configuration of the chassis bus from different configurations each having different chassis form factors.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous transport robot vehicle for transporting a payload, the autonomous transport robot vehicle comprising:
  a chassis that is a space frame formed of:
    longitudinal hollow section beams, arrayed to form longitudinally extended sides of the space frame, and respective front and rear lateral beams closing opposite ends of the space frame;
  a payload support connected to the chassis and dependent therefrom; and
  ride wheels dependent from the chassis, proximate opposite end corners of the chassis, on which the autonomous transport robot vehicle rides so as to traverse a traverse surface, the ride wheels include at least one caster wheel and a pair of drive wheels supporting the chassis from the traverse surface, and
  wherein the ride wheels and chassis in combination form a low profile height from the traverse surface to atop the chassis, where a chassis height and a ride wheel height are overlapped at least in part so that a payload support contact surface of the payload support is nested between and within the ride wheel height of the ride wheels; and
  wherein the space frame has predetermined modular coupling interfaces, each disposed for removably coupling, as a module unit, a corresponding predetermined electronic or mechanical component module of the autonomous transport robot vehicle to the chassis.

2. The autonomous transport robot vehicle of claim 1, wherein the predetermined modular coupling interfaces include at least one caster wheel module coupling interface, at least one drive wheel module coupling interface, and at least one payload support module coupling interface.

3. The autonomous transport robot vehicle of claim 2, wherein the at least one caster wheel is selectable from a number of different selectably interchangeable caster wheel modules, each with a different predetermined mechanical or electrical caster wheel module characteristic.

4. The autonomous transport robot vehicle of claim 2, wherein drive wheels of the pair of drive wheels are selectable from a number of different selectably interchangeable drive wheel modules, each with a different predetermined mechanical or electrical drive wheel module characteristic.

5. The autonomous transport robot vehicle of claim 2, wherein the payload support is selectable from a number of different interchangeable payload support modules, each with a different predetermined mechanical or electrical payload support module characteristic.

6. The autonomous transport robot vehicle of claim 2, wherein the at least one drive wheel module coupling interface includes separate and distinct interfaces for respective separate and distinct drive wheel modules of each different drive wheel of the pair of drive wheels.

7. The autonomous transport robot vehicle of claim 1, wherein the longitudinal hollow section beams and the respective front and rear lateral beams of the space frame are mechanically fastened to each other.

8. The autonomous transport robot vehicle of claim 1, wherein the payload support comprises the payload support contact surface on which a payload resting on the payload support is seated, the payload support contact surface is disposed atop the chassis.

9. The autonomous transport robot vehicle of claim 1, wherein the space frame is configured so that the chassis is substantially rigid with predetermined rigidity characteristics, with a shape and form that provides a minimum height from the traverse surface to atop the chassis.

10. The autonomous transport robot vehicle of claim 1, wherein a configuration of the space frame resolves both predetermined rigidity characteristics and a minimum low profile height of chassis from the traverse surface to atop the chassis.

11. The autonomous transport robot vehicle of claim 1, wherein the chassis has a selectably variable configuration, selectable from different configurations each having different chassis form factors.

12. The autonomous transport robot vehicle of claim 1, wherein at least one of the longitudinal hollow section beams, the front lateral beam, and the rear lateral beam, is selectable from a number of different selectably interchangeable respective longitudinal hollow section beams, front lateral beams, and rear lateral beams each with different predetermined mechanical characteristics.

13. The autonomous transport robot vehicle of claim 12, wherein selection of the at least one of the longitudinal hollow section beams, the front lateral beam, and the rear lateral beam from the number of different selectably interchangeable respective longitudinal hollow section beams, the front lateral beams, and the rear lateral beams determines a selected variable configuration of the chassis.

14. An autonomous transport robot vehicle for transporting a payload, the autonomous transport robot vehicle comprising:
 a chassis bus with predetermined modular coupling interfaces, each disposed for removably coupling, as a module unit, corresponding predetermined component modules of the autonomous transport robot vehicle to the chassis bus so that the autonomous transport robot vehicle has a modular construction, the predetermined modular coupling interfaces include datum surfaces at which a respective predetermined component module is coupled to the chassis bus in a known and repeatable position relative to at least the chassis bus; and
 wherein the corresponding predetermined component modules include at least one of:
  a payload support module with a payload support contact surface removably coupled as a module unit to the chassis bus with a corresponding payload support module coupling interface;
  a caster wheel module with a caster wheel removably coupled as a module unit to the chassis bus with a corresponding caster wheel module coupling interface; and
  a drive wheel module with a drive wheel removably coupled as a module unit to the chassis bus with a corresponding drive wheel module coupling interface.

15. The autonomous transport robot vehicle of claim 14, wherein the caster wheel module is selectable from a number of different selectably interchangeable caster wheel modules, each with a different predetermined mechanical or electrical caster wheel module characteristic.

16. The autonomous transport robot vehicle of claim 14, wherein the drive wheel module is selectable from a number of different selectably interchangeable drive wheel modules, each with a different predetermined mechanical or electrical drive wheel module characteristic.

17. The autonomous transport robot vehicle of claim 16, wherein the corresponding drive wheel module coupling interface includes separate and distinct interfaces for respective separate and distinct drive wheel modules.

18. The autonomous transport robot vehicle of claim 14, wherein the payload support module is selectable from a number of different interchangeable payload support modules, each with a different predetermined mechanical or electrical payload support module characteristic.

19. The autonomous transport robot vehicle of claim 14, wherein the chassis bus is a space frame formed of:
 longitudinal hollow section beams, arrayed to form longitudinally extended sides of the space frame, and
 respective front and rear lateral beams closing opposite ends of the space frame.

20. The autonomous transport robot vehicle of claim 14, wherein the autonomous transport robot vehicle includes at least one caster wheel module and at least one drive wheel module, the at least one caster wheel module and the at least one drive wheel module are dependent from the chassis bus, proximate opposite end corners of the chassis, where the autonomous transport robot vehicle rides on at least a caster wheel of the at least one caster wheel module and at least one drive wheel of the at least one drive wheel module so as to traverse a traverse surface.

21. The autonomous transport robot vehicle of claim 14, wherein the payload support contact surface, on which a payload resting on the payload support module is seated, is disposed atop the chassis bus.

22. The autonomous transport robot vehicle of claim 14, wherein the chassis bus has a selectably variable configuration, selectable from different configurations each having different chassis form factors.

* * * * *